United States Patent
Rugeland et al.

(10) Patent No.: US 12,156,018 B2
(45) Date of Patent: Nov. 26, 2024

(54) CONDITIONAL CONFIGURATION IN A WIRELESS COMMUNICATION NETWORK

(71) Applicant: Telefonaktiebolaget LM Ericsson (PUBL), Stockholm (SE)

(72) Inventors: Patrik Rugeland, Stockholm (SE); Oumer Teyeb, Montréal (CA); Mattias Bergström, Sollentuna (SE); Icaro Leonardo Da Silva, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 361 days.

(21) Appl. No.: 17/626,869

(22) PCT Filed: Jul. 17, 2020

(86) PCT No.: PCT/SE2020/050738
§ 371 (c)(1),
(2) Date: Jan. 13, 2022

(87) PCT Pub. No.: WO2021/010890
PCT Pub. Date: Jan. 21, 2021

(65) Prior Publication Data
US 2022/0377633 A1 Nov. 24, 2022

Related U.S. Application Data

(60) Provisional application No. 62/875,067, filed on Jul. 17, 2019.

(51) Int. Cl.
*H04W 36/00* (2009.01)
*H04W 74/0833* (2024.01)

(52) U.S. Cl.
CPC . *H04W 36/0061* (2013.01); *H04W 36/00838* (2023.05); *H04W 74/0833* (2013.01)

(58) Field of Classification Search
CPC ......... H04W 74/0833; H04W 36/0061; H04W 36/0837
(Continued)

(56) References Cited

U.S. PATENT DOCUMENTS 11,818,620 B2 * 11/2023 Chang ................... H04W 76/27
11,924,704 B2 * 3/2024 Da Silva ........... H04W 36/0016
(Continued)

FOREIGN PATENT DOCUMENTS

CA     3 047 626 A1    6/2018
JP    2011 530889 A1   12/2011
(Continued)

OTHER PUBLICATIONS

3GPP TS 38.300 v15.2.0; Technical Specification; 3rd Generation Partnership Project; Technical Specification Group Radio Access Network; NR; NR and NG-RAN Overall Description; Stage 2 (Release 15)—Jun. 2018.
(Continued)

*Primary Examiner* — Peter G Solinsky
(74) *Attorney, Agent, or Firm* — Baker Botts L.L.P.

(57) ABSTRACT

A user equipment receives multiple conditional reconfigurations associated with respective conditions. The user equipment is to execute a conditional configuration upon fulfillment of an associated condition. The user equipment accordingly executes one of the multiple conditional configurations upon fulfillment of an associated condition. The user equipment transmits, to a target radio network node, an indication that indicates which one of the multiple conditional reconfigurations the user equipment executed.

23 Claims, 16 Drawing Sheets

(58) Field of Classification Search
USPC .......................................................... 370/331
See application file for complete search history.

(56) References Cited

U.S. PATENT DOCUMENTS

| | | | |
|---|---|---|---|
| 2019/0150096 A1 | 5/2019 | Lee et al. | |
| 2022/0038976 A1* | 2/2022 | Hwang | H04W 36/0079 |
| 2022/0124519 A1* | 4/2022 | Xu | H04W 24/04 |
| 2022/0217556 A1* | 7/2022 | Rydén | H04W 36/008375 |
| 2022/0394445 A1* | 12/2022 | Zakrzewski | H04W 4/70 |

FOREIGN PATENT DOCUMENTS

| | | |
|---|---|---|
| JP | 2022 505745 A | 1/2022 |
| RU | 2 454 001 C2 | 6/2012 |
| WO | 2010 057127 A1 | 5/2010 |
| WO | 2020 082643 A1 | 4/2020 |

OTHER PUBLICATIONS

3GPP TSG-RAN WG2#105bis meeting; Xi'an, China; Source: Sharp; Title: Open issues for multiple candidate cells in conditional handover in NR (R2-1903768)—Apr. 8-12, 2019.

3GPP TSG-RAN WG2 Meeting #106; Reno, USA; Source: Nokia, Nokia Shanghai Bell; Title: Conditional Handover in E-UTRAN—other aspects (R2-1907276)—May 13-17, 2019.

PCT International Search Report issued for International application No. PCT/SE2020/050738—Nov. 30, 2020.

PCT Written Opinion of the International Searching Authority issued for International application No. PCT/SE2020/050738—Nov. 30, 2020.

Official Communication issued for Patent application No. Japanese Patent Application 2022-500913—Feb. 17, 2023.

3GPP TSG-RAN WG2 Meeting #105; Athens, Greece; Feb. 25-Mar. 1, 2019; Agenda Item: 12.3.3; Source: CMCC; Title: Open Issues for Conditional Handover (R2-1901958).

3GPP TSG-RAN WG2 Meeting #106; Reno, USA; May 13-17, 2019; Agenda Item: 11.2.2.2; Source: Spreadtrum Communications; Title: NR-U Mobility Consideration (R2-1905683 (Revision of R2-1903790)).

3GPP TSG RAN WG2 #106; Reno, US; Agenda Item: 11.9.3.1 Conditional handover; Source: Ericsson; Title: Conditional handover failures in NR (R2-1906215 (Revision of R2-1903520)).

3GPP TSG RAN WG2 #106; Reno, US; May 13-17, 2019; Agenda Item: 11.9.3.1 Conditional handover; Source: Ericsson; Title: TP to 38.300 on Conditional Handover in NR (R2-1906219).

Office Action issued for Japanese Patent Application Serial No. 2022-500913—Oct. 20, 2023.

3GPP TSG RAN WG2 #105bis; Xi'an, China, Apr. 8-12, 2019; Agenda Item: 11.9.3 Handover robustness improvements; Title: Configuration of Conditional handover (R2-1903516).

Russian Office Action issued for Application No. 2022103887—Jul. 6, 2022.

3GPP TSG RAN WG2 #106; Reno, US; Source: Ericsson; Title: Configuration of Conditional handover in NR (R2-1906210)—May 13-17, 2019.

Russian Search Report issued for Application No. 2022103887—Jul. 6, 2022.

* cited by examiner

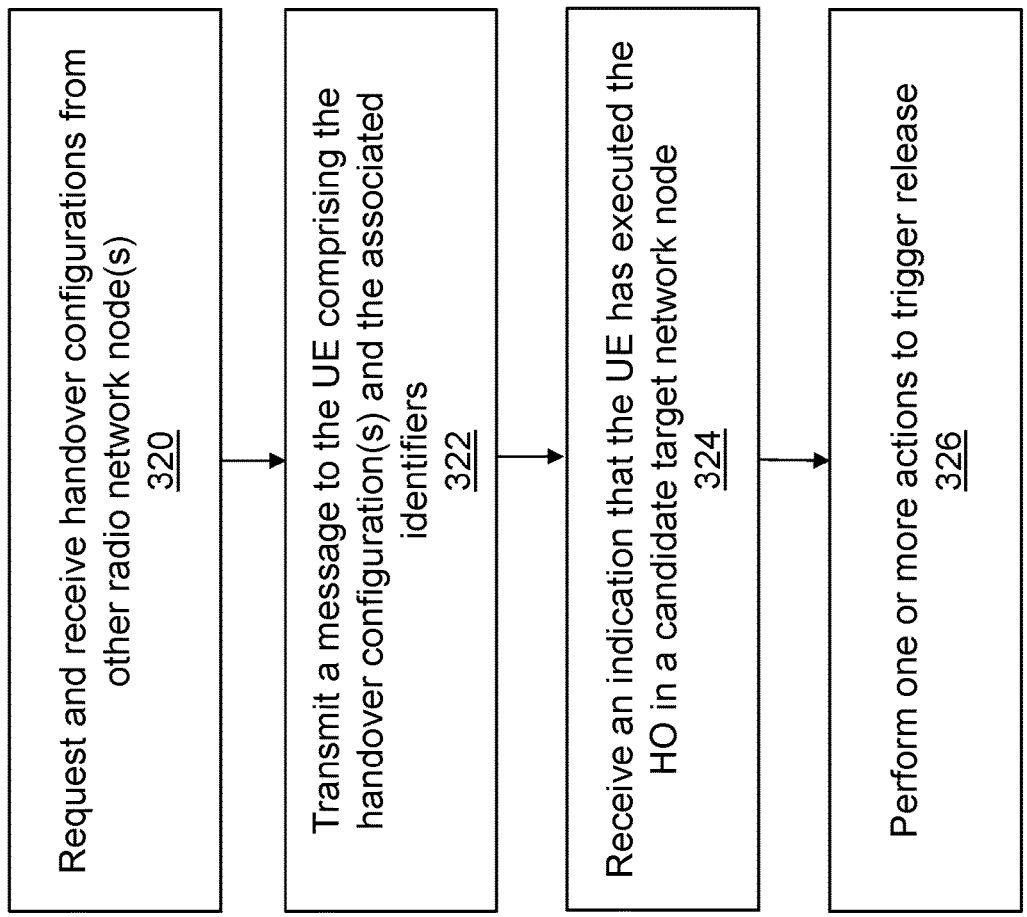

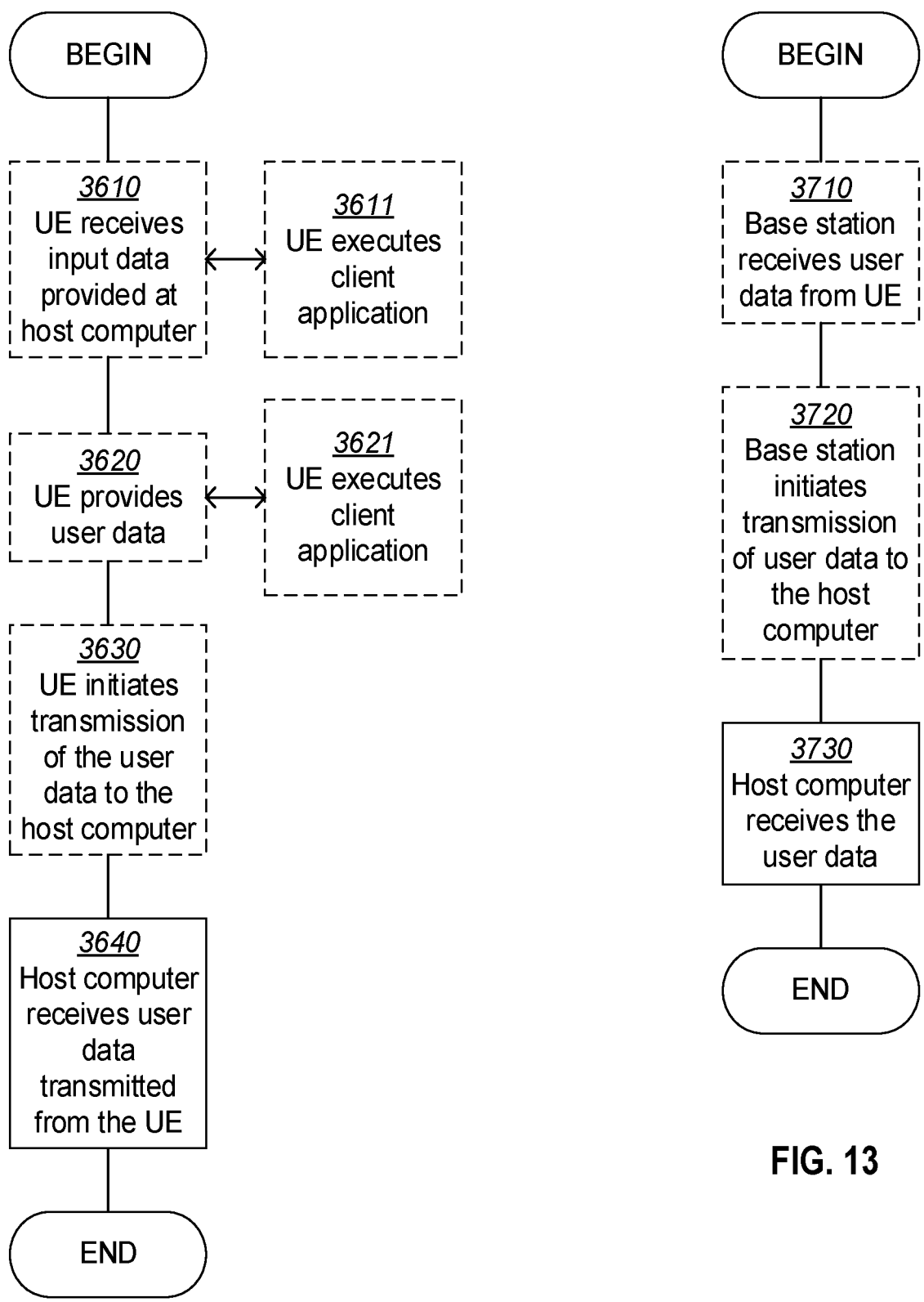

CONDITIONAL CONFIGURATION IN A WIRELESS COMMUNICATION NETWORK

PRIORITY

This nonprovisional application is a U.S. National Stage Filing under 35 U.S.C. § 371 of International Patent Application Serial No. PCT/SE2020/050738 filed Jul. 17, 2020 and entitled "CONDITIONAL CONFIGURATION IN A WIRELESS COMMUNICATION NETWORK" which claims priority to U.S. Provisional Patent Application No. 62/875,067 filed Jul. 17, 2019, both of which are hereby incorporated by reference in their entirety.

TECHNICAL FIELD

The present application relates generally to a wireless communication network, and relates more particularly to conditional configuration in such a network.

BACKGROUND

In a typical wireless communication network, user equipments (UE), also known as wireless communication devices, mobile stations, stations (STA) and/or wireless device, communicate via a Radio Access Network (RAN) to one or more core networks (CN). The RAN covers a geographical area which is divided into service areas or cells, with each service area or cell being served by a radio network node such as a radio access node e.g., a Wi-Fi access point or a radio base station (RBS), which in some networks may also be denoted, for example, a "NodeB" (NB) or "eNodeB" (eNB), "gNodeB" (gNB). A service area or cell is a geographical area where radio coverage is provided by the radio network node. The radio network node communicates over an air interface operating on radio frequencies with the UE within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for UEs. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3$^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain. New radio (NR) is a new radio access technology being standardized in 3GPP.

There are two new work items for mobility enhancements in LTE and NR that have started in 3GPP in release 16. The main objectives of the work items are to improve the robustness at handover and to decrease the interruption time at handover.

One problem related to robustness at handover is that the HO Command (RRCConnectionReconfiguration with mobilityControlInfo and RRCReconfiguration with a reconfigurationWithSync field) is normally sent when the radio conditions for the UE are already quite bad. That may lead to that the HO Command may not reach the UE in time if the message is segmented or there are retransmissions.

One solution to increase mobility robustness in NR is called "conditional handover" or "early handover command". To avoid the undesired dependence on the serving radio link upon the time (and radio conditions) where the UE should execute the handover radio resource control (RRC) signaling for the handover may be provided to the UE earlier. To achieve this, the HO command may be associated with a condition e.g. based on radio conditions possibly similar to the ones associated to an A3 event, where a given neighbour cell becomes X dB better than a primary cell (Pcell). As soon as the condition is fulfilled, the UE executes the handover in accordance with the provided handover command.

Such a condition could e.g. be that the quality of the target cell or beam becomes X dB stronger than the serving cell (similar to an A3-like event may be configured to trigger measurement reports). The threshold Y used in a preceding measurement reporting event may then be chosen lower than the one in the handover execution condition. This allows the serving cell to prepare the handover upon reception of an early measurement report and to provide the RRCConnectionReconfiguration with mobilityControlInfo (LTE) or RRCReconfiguration with a reconfigurationWithSync (NR) at a time when the radio link between the source cell and the UE is still stable. The execution of the handover is done at a later point in time (and threshold) which is considered optimal for the handover execution.

In some embodiments, a cell-level quality or beam quality is used as a baseline for a CHO execution condition. A reference signal type Synchronization Signal Block (SSB) can be used for one or more such embodiments. Alternatively or additionally, Ax events (i.e. entry conditions) are used for CHO execution condition and events A3/5 as a baseline. The trigger quantity for CHO execution condition (reference signal received power (RSRP), reference signal received quality (RSRQ) or reference signal-signal to interference plus noise ratio (RS-SINR)) may be configured by the network.

In any event, while the UE evaluates the condition, it should continue operating per its current RRC configuration, i.e. without applying the conditional HO command. When the UE determines that the condition is fulfilled, it disconnects from the serving cell, applies the conditional HO command and connects to the target cell.

A conditional handover (CHO) in some sense may therefore be defined as a UE having a network configuration for initiating access to a target cell based on configured condition(s). Usage of a conditional handover may be decided by the network, and the UE evaluates when the condition is valid. In some embodiments, the baseline operation for the conditional HO procedure assumes a HO command type of message contains HO triggering condition(s) and dedicated RRC configuration(s). The UE may then access the prepared target when the relevant condition is met. The baseline operation for conditional HO may also assume the source RAN remains responsible for RRC until the UE successfully sends an RRC Reconfiguration Complete message to the target RAN.

FIG. 1 depicts an example with a single serving and target cell. More particularly, in FIG. 1, the serving gNB may exchange user plane (UP) data with the UE. In step 1, the UE sends a measurement report with a "low" threshold to the serving gNB. The serving gNB makes a handover (HO) decision based on this early report. In step 2, the serving gNB sends an early HO request to a target gNB. The target gNB accepts the HO request and builds an RRC configuration. The target gNB returns a HO acknowledgement, including the RRC configuration, to the serving gNB in step 3. In step 4, a conditional HO command with a "high" threshold is sent to the UE. Subsequently, measurements by the UE may fulfil the HO condition of the conditional HO command. The UE thus triggers the pending conditional handover. The UE performs synchronization and random access with the target gNB in step 5, and HO confirm is exchanged in step 6. In step 7, the target gNB informs the serving gNB that HO is completed. The target gNB may then exchange user plane (UP) data with the UE.

In practice, though, there may often be many cells or beams that the UE reported as possible candidates based on its preceding radio resource management (RRM) measurements. Generally, then, the network may configure conditional handover commands for several target cell candidates.

SUMMARY

A user equipment (UE) may be configured with multiple conditional handover configurations towards the same node, e.g. where each configuration may be associated to different target cell candidates from that node, comprising different sets of secondary cells, specific beams, number of multiple input multiple output (MIMO) layers, etc. In this case, the UE would trigger only one of these conditional configurations and send a RRCReconfigurationComplete message to the target node. However, the target node would heretofore not be able to distinguish which of the conditional handover configurations was triggered.

An object of embodiments herein is to provide a mechanism for improving, in an efficient manner, performance of the wireless communication network e.g. handling handover efficiently in the wireless communication network.

Some embodiments herein achieve this object by providing a mechanism to allow multiple conditional handover configurations applicable to the same target candidate cell and to allow the UE to indicate which of the HO configurations it has executed. Doing so allows the network to configure the UE with different configurations for a given target such as different carrier aggregation (CA) configurations with the same target PCell. Some embodiments also allow release of a specific CHO configuration in a candidate target cell.

More particularly, embodiments herein include a method performed by a user equipment. The method comprises receiving multiple conditional configurations associated with respective conditions. In some embodiments, the user equipment is to execute a conditional configuration upon fulfillment of an associated condition. The method further comprises executing one of the multiple conditional configurations upon fulfillment of an associated condition. The method also comprises transmitting, to a target radio network node, an indication that indicates which one of the multiple conditional configurations the user equipment executed.

In some embodiments, different ones of the multiple conditional configurations are respectively associated with different identifiers, and the transmitted indication comprises an identifier associated with the executed conditional configuration. In one or more embodiments, receiving the multiple conditional configurations comprises receiving a message that indicates the multiple conditional configurations and that include the different identifiers associated with the multiple conditional configurations. In one such embodiment, the indication comprises an identifier that is received in the message and that is associated with the executed conditional configuration. In some embodiments, the different identifiers comprise different conditional configuration identifiers. In other embodiments, receiving the multiple conditional configurations comprises receiving a message that indicates the multiple conditional configurations. In one such embodiment, the transmitted indication is an identifier that is based on an order of the executed conditional configuration in the message.

In other embodiments, different ones of the multiple conditional configurations are respectively associated with different parameter configurations. In one such embodiment, the transmitted indication comprises an indication of a parameter configuration associated with the executed conditional configuration.

In some embodiments, different ones of the multiple conditional configurations are respectively associated with different sets of random access preambles, different time-frequency resource allocations, or different cell radio network temporary identifiers, C-RNTIs. In this case, the indication comprises transmission of a random access preamble in the set associated with the executed conditional configuration, transmission using the time-frequency resource allocation associated with the executed conditional configuration, or transmission of the C-RNTI associated with the executed conditional configuration.

In some embodiments, two or more of the multiple conditional configurations are conditional configurations towards the same target node.

In some embodiments, two or more of the multiple conditional configurations are conditional configurations towards the same target cell.

In some embodiments, two or more of the multiple conditional configurations are different conditional carrier aggregation configurations with the same target primary cell, PCell.

In some embodiments, two or more of the multiple conditional configurations are associated with different respective target cell candidates, different sets of secondary cells, different beams, different carrier aggregation configurations, and/or different numbers of multiple input multiple output layers.

In some embodiments, the indication is included in a message that confirms successful completion of an RRC connection reconfiguration.

In some embodiments, the multiple conditional configurations are multiple conditional handover configurations.

Embodiments herein also include a method performed by a radio network node. The method comprises configuring, for a user equipment, multiple conditional configurations associated with respective conditions. The user equipment is to execute a conditional configuration upon fulfillment of an associated condition. The multiple conditional configurations are conditional configurations toward the radio network node as a target candidate radio network node. The method also comprises receiving, from the user equipment, an indication that indicates which one of the multiple conditional configurations the user equipment executed.

In some embodiments, different ones of the multiple conditional configurations are respectively associated with different identifiers, and the received indication comprises an identifier associated with the executed conditional configuration. In one such embodiment, the method further comprises transmitting to another radio network node, or receiving from another radio network node, a message that includes the different identifiers associated with the multiple conditional configurations, and the indication comprises an identifier that is included in the message and that is associated with the executed conditional configuration. In some embodiments, the different identifiers comprise different conditional configuration identifiers. In one such embodiment, the method further comprises transmitting a message that indicates the multiple conditional configurations, and the received indication is an identifier that is based on an order of the executed conditional configuration in the message.

In some embodiments, different ones of the multiple conditional configurations are respectively associated with different parameter configurations, and the received indication comprises an indication of a parameter configuration associated with the executed conditional configuration.

In some embodiments, different ones of the multiple conditional configurations are respectively associated with different sets of random access preambles, different time-frequency resource allocations, or different cell radio network temporary identifiers, C-RNTIs. In this case, the indication may comprise reception of a random access preamble in the set associated with the executed conditional configuration, reception using the time-frequency resource allocation associated with the executed conditional configuration, or reception of the C-RNTI associated with the executed conditional configuration.

In some embodiments, two or more of the multiple conditional configurations are conditional configurations towards the same target cell.

In some embodiments, two or more of the multiple conditional configurations are different conditional carrier aggregation configurations with the same target primary cell, PCell.

In some embodiments, two or more of the multiple conditional configurations are associated with different respective target cell candidates, different sets of secondary cells, different beams, different carrier aggregation configurations, and/or different numbers of multiple input multiple output layers.

In some embodiments, the indication is included in a message that confirms successful completion of an RRC connection reconfiguration.

In some embodiments, the multiple conditional configurations are multiple conditional handover configurations.

In some embodiments, the method further comprises executing the conditional configuration that the received indication indicates was executed by the user equipment.

In some embodiments, the method further comprises, responsive to receiving the indication, releasing resources associated with one or more conditional configurations other than the conditional configuration that the received indication indicates was executed by the user equipment.

Embodiments herein also include a method performed by a radio network node. The method comprises transmitting, to a user equipment, multiple conditional configurations associated with respective conditions. In some embodiments, the user equipment is to execute a conditional configuration upon fulfillment of an associated condition. In some embodiments, the radio network node is a source radio network node of the multiple conditional configurations. The method may in any event further comprise transmitting, to the user equipment, identifiers or parameter configurations respectively associated with the multiple conditional configurations.

In some embodiments, the method further comprises receiving the identifiers or parameter configurations respectively associated with the multiple conditional configurations from another radio network node that is a target of the multiple conditional configurations.

In some embodiments, the method further comprises receiving the multiple conditional configurations from another radio network node that is a target of the multiple conditional configurations, generating the identifiers or parameter configurations, and transmitting the generated identifiers or parameter configurations to the another radio network node.

In some embodiments, the method further comprises receiving an indication that the user equipment has executed a conditional configuration in a candidate target network node. The method may also comprise, responsive to receiving the indication, transmitting, to each of one or more other candidate target network nodes, a message that includes an identifier of a conditional configuration and indicates the other candidate target network node is to release a user equipment context and/or radio resources for the conditional configuration identified by the identifier.

In some embodiments, two or more of the multiple conditional configurations are conditional configurations towards the same target node.

In some embodiments, two or more of the multiple conditional configurations are conditional configurations towards the same target cell.

In some embodiments, two or more of the multiple conditional configurations are different conditional carrier aggregation configurations with the same target primary cell, PCell.

In some embodiments, two or more of the multiple conditional configurations are associated with different respective target cell candidates, different sets of secondary cells, different beams, different carrier aggregation configurations, and/or different numbers of multiple input multiple output layers.

In some embodiments, the indication is included in a message that confirms successful completion of an RRC connection reconfiguration.

In some embodiments, the multiple conditional configurations are multiple conditional handover configurations.

Embodiments herein also include corresponding apparatus, computer programs, and carriers of those computer programs. For example, embodiments herein also include a user equipment, e.g., comprising a communication interface and processing circuitry. The user equipment is configured to receive multiple conditional configurations associated with respective conditions. In some embodiments, the user equipment is to execute a conditional configuration upon fulfillment of an associated condition. The method further comprises executing one of the multiple conditional configurations upon fulfillment of an associated condition. The user equipment is also configured to transmit, to a target radio network node, an indication that indicates which one of the multiple conditional configurations the user equipment executed.

Embodiments herein further include a radio network node, e.g., comprising a communication interface and processing circuitry. The radio network node is configured to configure, for a user equipment, multiple conditional configurations associated with respective conditions. The user equipment is to execute a conditional configuration upon fulfillment of an associated condition. The multiple conditional configurations are conditional configurations toward the radio network node as a target candidate radio network node. The radio network node is also configured to receive, from the user equipment, an indication that indicates which one of the multiple conditional configurations the user equipment executed.

Embodiments herein further include a radio network node, e.g., comprising a communication interface and processing circuitry. The radio network node is configured to transmit, to a user equipment, multiple conditional configurations associated with respective conditions. In some embodiments, the user equipment is to execute a conditional configuration upon fulfillment of an associated condition. In some embodiments, the radio network node is a source radio network node of the multiple conditional configurations. The radio network node is also configured transmit, to the user equipment, identifiers or parameter configurations respectively associated with the multiple conditional configurations.

BRIEF DESCRIPTION OF THE DRAWINGS

FIG. 3C is a logic flow diagram of a method performed by a first radio network node according to some embodiments.

FIG. 12 is a flowchart illustrating a method implemented in a communication system, in accordance with one embodiment.

FIG. 13 is a flowchart illustrating a method implemented in a communication system, in accordance with one embodiment.

DETAILED DESCRIPTION

Figure 2:
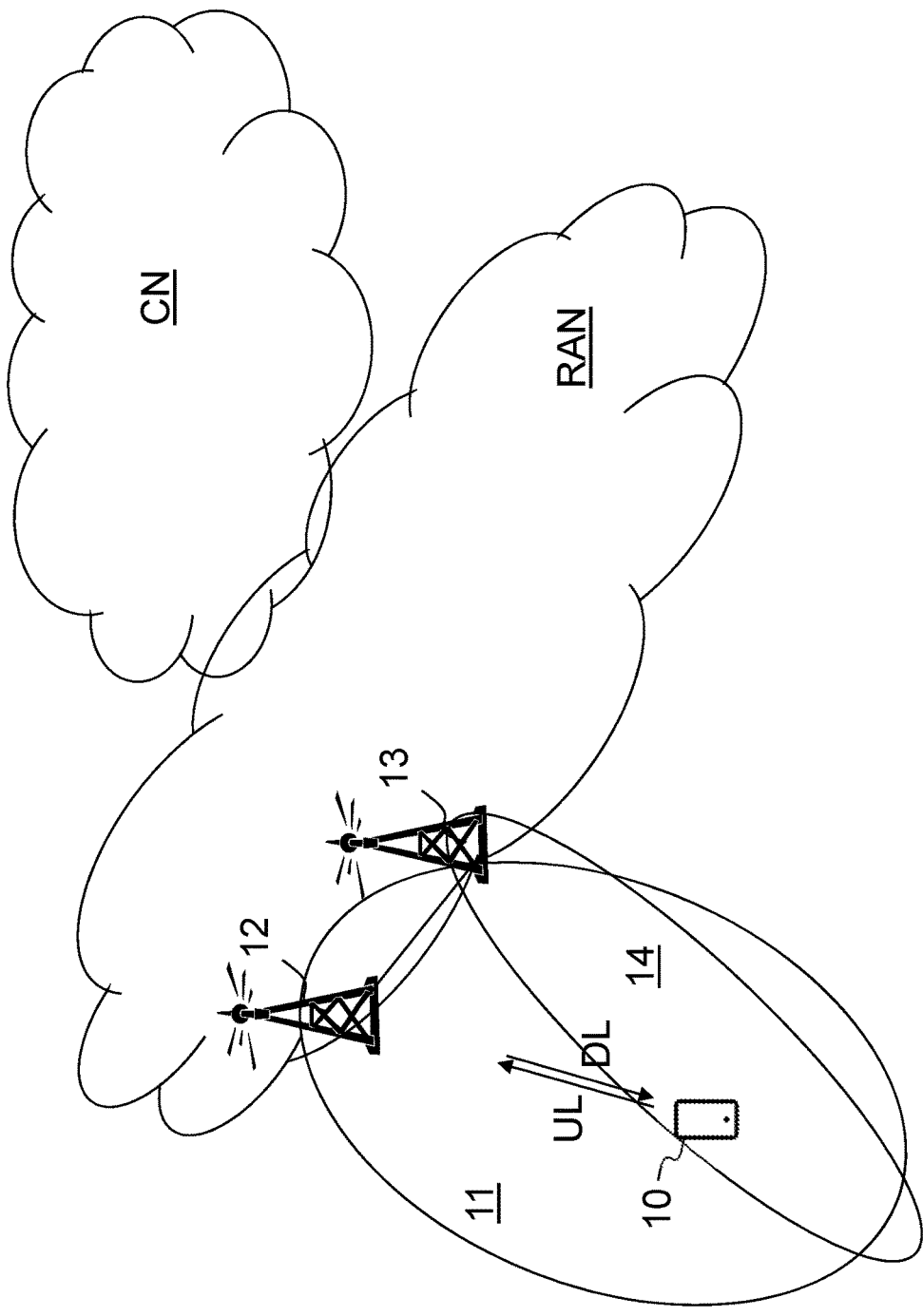
FIG. 2 is a block diagram of a wireless communication network according to some embodiments.

Embodiments herein relate to wireless communication networks in general. FIG. 2 is a schematic overview depicting a wireless communication network 1. The wireless communication network 1 comprises one or more radio access networks (RANs) e.g. a first RAN (RAN1), connected to one or more core networks (CNs). The wireless communication network 1 may use one or more technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context. However, embodiments are applicable also in further development of the existing communication systems such as e.g. 3G and LTE.

In the wireless communication network 1, wireless devices e.g. a user equipment (UE) 10 such as a mobile station, a non-access point (non-AP) station (STA), a STA, a UE and/or a wireless terminal, are connected via the one or more RANs, to the one or more CNs. It should be understood by those skilled in the art that "UE" is a non-limiting term which means any terminal, wireless communication terminal, communication equipment, Machine Type Communication (MTC) device, Device to Device (D2D) terminal, or user equipment e.g. smart phone, laptop, mobile phone, sensor, relay, mobile tablets or any device communicating within a cell or service area.

The wireless communication network 1 comprises a radio network node 12. The radio network node 12 is exemplified herein as a first radio network node or a first RAN node providing radio coverage over a geographical area, a first service area 11, of a first radio access technology (RAT), such as NR, LTE, UMTS, Wi-Fi or similar. The radio network node 12 may be a radio access network node such as radio network controller or an access point such as a wireless local area network (WLAN) access point or an Access Point Station (AP STA), an access controller, a base station, e.g. a radio base station such as a NodeB, a gNodeB, an evolved Node B (eNB, eNodeB), a base transceiver station, Access Point Base Station, base station router, a transmission arrangement of a radio base station, a standalone access point or any other network unit capable of serving a UE 10 within the service area served by the radio network node 12 depending e.g. on the radio access technology and terminology used and may be denoted as a primary radio network node. The radio network node 12 may alternatively be denoted as a serving radio network node providing a primary cell for the UE 10.

The wireless communication network 1 comprises a second radio network node 13. The second radio network node 13 is exemplified herein as a second RAN node providing radio coverage over a geographical area, a second service area 14, of a second RAT, such as NR, LTE, UMTS, Wi-Fi or similar. The second radio network node 13 may be a radio access network node such as radio network controller or an access point such as a wireless local area network (WLAN) access point or an Access Point Station (AP STA), an access controller, a base station, e.g. a radio base station such as a NodeB, a gNodeB, an evolved Node B (eNB, eNodeB), a base transceiver station, Access Point Base Station, base station router, a transmission arrangement of a radio base station, a stand-alone access point or any other network unit capable of serving a UE 10 within the service area served by the second radio network node 13 depending e.g. on the radio access technology and terminology used and may be denoted as a secondary radio network node. The radio network node 13 may alternatively be denoted as a serving radio network node providing a secondary cell, e.g. primary secondary cell, for the UE 10.

It should be noted that a service area may be denoted as cell, beam, beam group or similar to define an area of radio coverage. The first RAT may be the same as the second RAT or may be a different RAT than the second RAT.

Figure 3A:
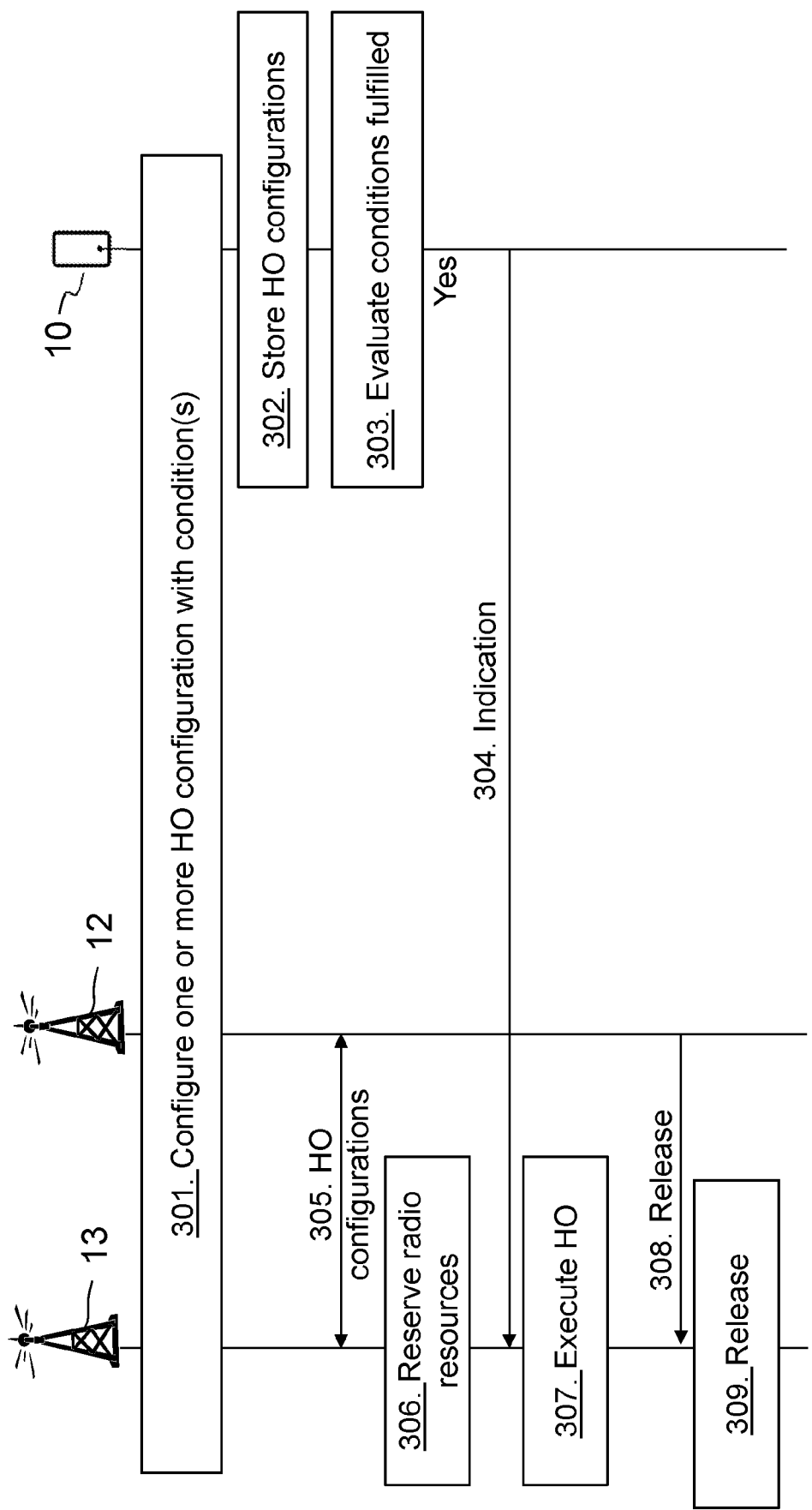
FIG. 3A is a call flow diagram of conditional handover according to some embodiments.

FIG. 3A is a schematic combined signaling scheme and flowchart depicting some embodiments herein.

Action 301. A source network node such as the first radio network node 12 may 10 configure the UE 10 with one or more (conditional) handover configuration(s), e.g., in the form of one or more RRC Reconfigurations. The first radio network node 12 may request and receive handover configurations from a candidate target radio network node such as the second radio network node 13. The handover configuration(s) from e.g. the second radio network node 13, may comprise identifier(s) for each handover configuration. Alternatively or additionally, the handover configurations from the second radio network node 13 may comprise suggested one or more conditions for each of the handover configuration(s), e.g. relative or absolute conditions. In this case, the first radio network node 12 may take these suggestions into account. Alternatively or additionally, the first radio network node 12 may associate an identifier to each received handover configuration. The identifiers of the handover configurations may be determined implicitly (e.g. first configuration gets identity=1, second one gets identity=2, etc.). Or, the first radio network node 12 may decide unique identities and indicate to the second radio network node 13 the assigned identifier for a corresponding handover configuration. The first radio network node 12 may transmit a message to the UE comprising the one or more handover configurations and the associated identifiers.

Action 302. The UE 10 may receive and store the one or more handover configurations, such as conditional handover configuration(s), with associated one or more conditions, from the first radio network node 12, i.e. the serving radio network node. The one or more handover configurations may for instance be or correspond to one or more RRC Reconfigurations. In some embodiments, each of these configurations is associated with the same candidate target cell, e.g. the second cell 14. In other embodiments, at least one candidate target cell has more than one handover configuration associated with it, but the UE can be configured with additional handover configurations associated to other cells with one or more handover configurations associated to each cell.

Regardless, in some embodiments, each handover configuration has an identifier, also referred to as an optional conditional configuration identifier. This identifier may be unique among all handover configurations, unique among all handover configuration(s) toward a specific cell, or unique among all handover configuration(s) toward a specific network node. If there is only a single handover configuration associated with the candidate target cell or radio network node, though, the identifier of the handover configuration may be omitted.

In one alternative solution, each handover configuration is distinguished by different random access channel (RACH) configurations, such as different sets of preambles, preamble to synchronization signal blocks (SSB) and/or channel state information-reference signals (CSI-RS) mapping, or time/frequency resource allocations, for each CHO configuration for the same cell. With that, the radio network node has means to distinguish which handover configuration the UE has executed. For example, if preamble X is associated to CHO configuration 1 for cell-A, e.g. with a secondary cell (SCell) configuration, and if preamble Y is associated to CHO configuration 2 for the same cell-A, e.g. without an SCell configuration, by preamble detection the target node candidate can distinguish which handover configuration the UE has executed. Alternatively or additionally to different RACH configurations, each handover configuration may be distinguished by different cell-radio network temporary identifiers (C-RNTIs) for each CHO configuration for the same cell. With that, the radio network node 12 has means to distinguish which configuration the UE has executed upon the reception of msg3. For example, if C-RNTI X is associated to CHO configuration 1 for cell-A, e.g. with an SCell configuration, and if C-RNTI Y is associated to CHO configuration 2 for the same cell-A, e.g. without an SCell configuration, by msg3 detection the target node candidate can distinguish which configuration the UE has executed. Generally, though, the RRCConnectionReconfiguration (or RRCReconfiguration, in NR) for each candidate may differ e.g. in terms of the HO execution condition (reference signal (RS) to measure and threshold to exceed), in terms of the random access (RA) preamble to be sent when a condition is met or the configuration itself to be used in a specific target candidate.

Action 303. The UE 10 may evaluate whether one or more conditions, such as trigger conditions for conditional handovers, are fulfilled. Thus, the UE 10 in this example determines that a condition related to mobility of the UE is fulfilled, wherein the condition is part of a first handover configuration out of one or more handover configurations.

Action 304. The UE 10, upon triggering the condition, may execute a conditional handover according to the first handover configuration. Execution of the conditional handover according to the first handover configuration may for instance mean that the UE 10 applies the first handover configuration and executes the conditional handover upon that configuration. Thus, the UE 10 transmits an indication that the condition is fulfilled and also indicates that the condition is part of the first handover configuration. The indication thereby indicates which one of the one or more handover configurations the UE 10 executed. For example, the UE may transmit a message such as an RRCReconfigurationComplete message (or similar, e.g. ConditionalReconfigurationComplete message) toward the target node/cell, e.g. the first or the second radio network node, which fulfilled the trigger condition. The message may comprise the identifier associated with the executed (conditional) handover configuration. In some embodiments, though, if the handover configuration is the only handover configuration associated with the target cell and the identifier was omitted in the previous step, the UE 10 may omit the identifier from the complete message; alternatively, the UE uses a default value, e.g. 0, for the identifier.

Each of these handover configurations may be associated with different target cell candidates associated to the same target network node. In that case, the distinction of which configuration the UE executes is done via network implementation, as described further.

Action 305. Meanwhile, the second radio network node 13, also referred to as a candidate target node, may have received a request from the first radio network node 12 to configure CHO for the UE 10 e.g. receiving a CHO or HO REQUEST message over X2, Xn or any other inter-node interface. The second radio network node 13 may in response provide (transmit) one or multiple CHO configurations for the same target cell candidate for the UE 10. For example, the second radio network node 13 may do so by transmitting a CHO or HO REQUEST ACK message over X2, Xn or any other inter-node interface, which comprises for each CHO configuration an RRCReconfiguration-like message with reconfiguration with synchronization (or at least the content of the message) for the same target cell candidate. The response may comprise recommended conditions of the CHO configuration associated to different configurations, e.g. relative or absolute conditions. The response may comprise an identifier associated to each CHO configuration. In an alternative solution, the response may comprise, for each CHO configuration, some distinguishing parameter configurations, such as different RACH configurations and/or different C-RNTIs for each CHO configuration for the same cell, as described above.

Action 306. The second radio network node 13 may reserve radio resources for CHO for that UE 10, e.g. C-RNTI, contention-free RACH resources, etc. Herein, one advantage of the case of using different identifiers associated to different CHO configurations, instead of different distinguishing parameter configurations, is that some of these resources may be reused in different handover configurations for the same cell, which has a lower cost in terms of resources allocated for conditional HO.

Action 307. The second radio network node 13 may receive the indication from the UE 10, which the UE 10 transmitted in Action 304. The second radio network node 13 may execute a performance based on the received indication and fulfilled condition.

Upon the UE 10 triggering the handover configuration associated to the second radio network node 10, the second radio network node 13 may thus receive an RRC message (e.g. the RRCReconfigurationComplete) comprising the identifier. The second radio network node 13 may then execute the handover configuration associated with the identifier indicated by the UE 10 in the RRC Reconfiguration complete (including e.g. performing a path switch request to the core network which will instruct the first radio network node 12 to release the UE context/resources).

In an alternative solution where the UE was configured with handover configurations for the same cell but with distinguished parameter configurations, the second radio network node may use at least one of these to distinguish which configuration the UE 10 has executed: a RACH preamble, preamble to SSBs/CSI-RSs mapping, or time/frequency resource allocations, as described above. The second radio network node 13 may then execute handover configurations associated to the used parameter (e.g. preamble, time/frequency resource, C-RNTI, etc.).

Action 308. Upon receiving a HO indication that the UE has executed the handover in a candidate target network node (e.g. via X2/Xn signaling or from the CN via S1/NG signalling), the first radio network node 12 may prompt the release of UE context and/or radio resources associated with CHO configurations that were not executed. For example, in some embodiments, for each candidate target network node except the one in which the UE 10 executed the CHO, the first radio network node 12 may transmit a single message to release UE context and/or radio resources associated to all CHO configurations for that UE. In other embodiments, the first radio network node 12 may transmit one message per CHO configuration, comprising the conditional configuration identifier, to each candidate target network node to release the UE context and/or radio resources.

Action 309. The second radio network node 13 may receive the HO indication and may release the radio resources associated with other handover configurations associated to the second radio network node 13 executing the HO for the UE 10. The second radio network node 13 may receive a message from the second radio network node 13 to release all handover configurations; and/or release of all CHO configurations associated to the UE. Thus, the second radio network node 13, or another radio network node, may receive one or more messages from the first radio network node 11 comprising the identifier, indicating to release a handover configuration, and may release the handover configurations associated to the UE 10 as indicated by the conditional configuration identifier.

Embodiments herein thereby allow multiple (conditional) handover configurations applicable to a same target candidate cell and allow the UE 10 to indicate which of the configurations it has executed. Doing so allows the second radio network node 13 to configure the UE with different HO configurations for a given target such as different carrier aggregation (CA) configurations with the same target PCell. Some embodiments also allow release of a specific CHO configuration in a candidate target cell.

Consider now other embodiments where the handover configurations are related to different target cells of e.g. the second radio network node 13, e.g. CHO1 that has a PCell=cell1, CHO2 that has a PCell=cell2, etc . . . where cell1, cell2, . . . are different cells of the same target node or a different node. In this case, the second radio network node 13 may receive a request from the first radio network node 12 to configure handover, also known as conditional handover, for a given UE e.g. receiving a CHO or HO REQUEST message over X2, Xn or any other inter-node interface.

The second radio network node 13 may provide in response, one or multiple handover configurations for different target cells for the UE 10. The second radio network node 13 may do so by transmitting a CHO or HO REQUEST ACK message over X2, Xn or any other inter-node interface, where the message comprises for each handover configuration an RRCReconfiguration-like message with reconfiguration with synchronization, or at least the content of the message, for these different target cells. The response may comprise recommended conditions associated to different HO configurations (e.g. relative or absolute conditions). The response may comprise an identifier associated to each HO configuration. Accordingly, for the case the second radio network node 13 is configuring CHO for different cells, that second radio network node 13 may reuse parameters that could be otherwise used to distinguish which cell the UE 10 is accessing. In other words, embodiments herein enable or allow the second radio network node 13 to allocate for these different candidate cells the same C-RNTI or the same RACH configuration(s), or even allow a CHO without security keys refresh (since these are different cells, the network could have chosen to perform CHO with key refresh for the sake of distinguishing for which cell the UE has executed the handover i.e. which CHO configuration was triggered). In one embodiment, for this case, the UE uses a cell identifier to distinguish the different configurations i.e. that is what is reported in the RRC Reconfiguration Complete like message in the target node.

The second radio network node may further reserve radio resources for CHO for the UE 10 e.g. C-RNTI, contention-free RACH resources, etc. At that step, the second radio network node may use the resource reservations as a way to distinguish the target cell for which the UE has executed the conditional handover when the UE access the target node. For example, there could be different ways to distinguish the different target cell candidates: A RACH preamble, preamble to SSBs/CSI-RSs mapping, or time/frequency resource allocations. For example, if preamble X is associated to CHO configuration 1 for cell-A and if preamble Y is associated to CHO configuration 2 for a different cell-B, by preamble detection the target node candidate can distinguish which configuration the UE has executed, and which cell the UE is connected to. That could allow the target to possibly configure the same C-RNTI for multiple target cell candidates for the same target candidate node (since distinction could be done via RACH distinction). The different target cell candidates could also be distinguished via C-RNTIs for each CHO configuration for the different cells. For example, if C-RNTI X is associated to CHO configuration 1 for cell-A and if C-RNTI Y is associated to CHO configuration 2 for a different cell-B, by msg3 detection the target node candidate can distinguish which configuration the UE has executed. That would allow the target node to distinguish the target cell for which the UE has executed CHO, and at the same time allow the target to allocate the same set of RACH resource for the same UE, on a per-node basis, rather than a per-cell basis e.g. contention free RACH resources. The different target cell candidates may alternatively or additionally be distinguished via security configuration. For example, if handover is configured with key refresh, a target cell identifier is used as input. Hence, upon receiving an encrypted and integrity protected Packet Data Convergence Protocol (PDCP) Packet Data Unit (PDU) (with the RRC Reconfiguration Complete like message), the network can test different hypothesis for different target cell ID candidates, as a way to figure out which target cell the UE is triggering CHO. Using the previous methods (C-RNTI and RACH) allows on the other hand the usage of CHO without security key refresh.

In any event, the second radio network node 12 may, upon the UE triggering a HO configuration associated to the second radio network node 13, receive an RRC message, e.g. RRCReconfigurationComplete, comprising the identifier. The identifier may be the cell identifier that is used as a way to indicate which cell the UE is accessing, in case common parameters for the different target cell candidates have been provided e.g. RACH, C-RNTI, etc. That allows the usage of CHO without security key refresh.

The second radio network node 13 may then execute the HO configurations associated to the identifier indicated by the UE 10 in the RRC Reconfiguration complete, including performing a path switch request to the core network which will instruct the source network node to release the UE context/resources. In an alternative embodiment where the UE 10 was configured with HO configurations for different cells and with distinguished parameter configurations, the second radio network node 13 may execute HO configurations associated to the used parameter, e.g. preamble, timer/frequency resource, C-RNTI, etc.

Figure 3B:
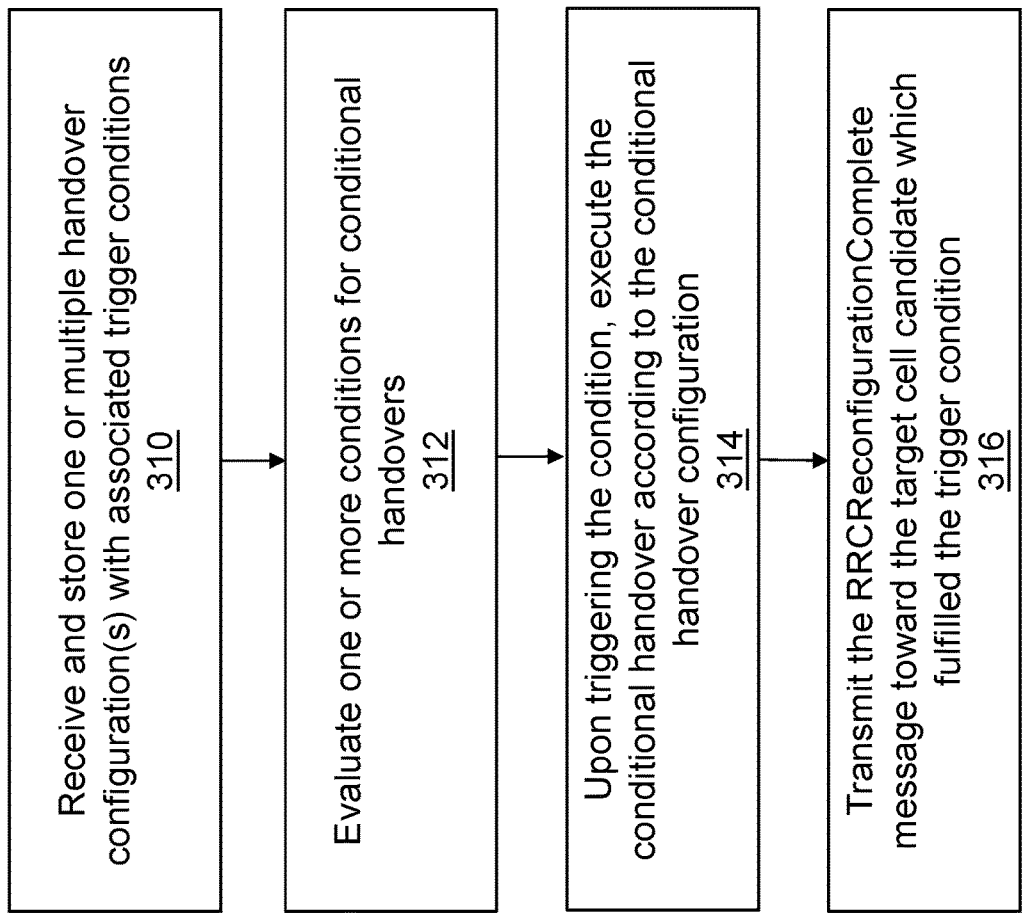
FIG. 3B is a logic flow diagram of a method performed by a user equipment according to some embodiments.

In view of the above, FIG. 3B shows a method at a UE for handling (conditional) handover configurations when triggering a conditional handover according to some embodiments. The UE 10 according to the method shown may receive and store one or multiple handover configuration(s) with associated trigger conditions, from a source network node (Step 310). Each of these configurations are associated to a given target cell candidate (i.e. target PCell, PSCell, SpCell).

In some embodiments, each handover configuration has an identifier, also referred to as conditional configuration identifier. This identifier may be unique among all conditional handover configurations, unique among all conditional handover configuration(s) toward a specific cell, or unique among all conditional handover configuration(s) toward a specific radio network node. If there is only a single HO configuration associated to a candidate target network node, the conditional configuration identifier can be omitted.

Regardless, the identifier in these and other embodiments may be implemented as shown in the example below of a possible implementation of the handover configuration:

```
-- ASN1START
-- TAG-RRCRECONFIGURATION-START
RRCReconfiguration ::=                SEQUENCE {
    rrc-TransactionIdentifier             RRC-TransactionIdentifier,
    criticalExtensions                    CHOICE {
        rrcReconfiguration                    RRCReconfiguration-IEs,
        criticalExtensionsFuture              SEQUENCE { }
    }
}
RRCReconfiguration-IEs ::=            SEQUENCE {
    radioBearerConfig                     RadioBearerConfig   OPTIONAL, -- Need M
    secondaryCellGroup                    OCTET STRING (CONTAINING CellGroupConfig)
                                              OPTIONAL, -- Need M
    measConfig                            MeasConfig OPTIONAL, -- Need M
    lateNonCriticalExtension              OCTET STRING OPTIONAL,
    nonCriticalExtension                  RRCReconfiguration-v1530-IEs OPTIONAL
}
RRCReconfiguration-v1530-IEs ::=          SEQUENCE {
    masterCellGroup                           OCTET STRING (CONTAINING CellGroupConfig)
```

```
                                    OPTIONAL,  -- Need M
    fullConfig                      ENUMERATED {true} OPTIONAL, -- Cond FullConfig
    dedicatedNAS-MessageList           SEQUENCE (SIZE(1..maxDRB)) OF
                                    DedicatedNAS-Message OPTIONAL, -- Cond nonHO
    masterKeyUpdate                 MasterKeyUpdate OPTIONAL, -- Cond MasterKeyChange
    dedicatedSIB1-Delivery             OCTET STRING (CONTAINING SIB1)
                                    OPTIONAL, -- Need N
    dedicatedSystemInformationDelivery    OCTET STRING (CONTAINING
                                    SystemInformation) OPTIONAL, -- Need N
    otherConfig                     OtherConfig OPTIONAL, -- Need M
    nonCriticalExtension            RRCReconfiguration-v1540-IEs OPTIONAL
}
RRCReconfiguration-v1540-IEs ::=         SEQUENCE {
    otherConfig-v1540               OtherConfig-v1540        OPTIONAL, -- Need M
    nonCriticalExtension            SEQUENCE {} RRCReconfiguration-v16xxx-IEs
                                    OPTIONAL
}
RRCReconfiguration-v16xxx-IEs ::=        SEQUENCE {
    conditionalRRCReconfiguration           ConditionalRRCReconfiguration OPTIONAL, --
                                    Need M
    nonCriticalExtension            SEQUENCE { }             OPTIONAL
}
MasterKeyUpdate ::=                 SEQUENCE {
    keySetChangeIndicator              BOOLEAN,
    nextHopChainingCount               NextHopChainingCount,
    nas-Container                   OCTET STRING OPTIONAL,         -- Cond securityNASC
    ...
}
-- TAG-RRCRECONFIGURATION-STOP
-- ASN1STOP
1
-- ASN1START
-- TAG-CONDITIONALRRCRECONFIGURATION-START
ConditionalRRCReconfiguration ::=        SEQUENCE {
    conditionalConfigurationList         SEQUENCE (SIZE (1..maxCandidateTargetCells))
                                    OF ConditionalConfigurationPerCell}
    }
}
ConditionalConfigurationPerCell ::=          SEQUENCE {
    candidateCellId                 PhysCellId
    conditionalConfigurationPerCellList         SEQUENCE (SIZE
          (1 ..maxConditionalConfigurationsPerCell)) OF ConditionalConfiguration
}
ConditionalConfiguration ::=        SEQUENCE {
    conditionalConfigurationId              INTEGER (1..maxConfigurationPerCell)
                                    OPTIONAL,        -- Need R
    triggerCondition                TriggerCondition
    conditionalConfiguration           OCTET STRING (Containing
RRCReconfiguration)
}
-- TAG-CONDITIONALRRCRECONFIGURATION-STOP
-- ASN1STOP
```

The UE 10 may receive an RRCReconfiguration message containing a ConditionalRRCReconfiguration. This ConditionalRRCReconfiguration contains a list (e.g. conditionalConfigurationList) of HO configurations (e.g. ConditionalConfigurationPerCell), each associated with a candidate target cell.

Each of these configurations may contain the cell identity (e.g. the physical cell identity, PhysCellId) of the target candidate cell (i.e. PCell, PSCell, SpCell) and a list of conditional configurations associated to that cell (e.g. conditionalConfigurationPerCellList)

Each of these configurations may in turn contain: (i) an identifier to separate which message is which, e.g. conditionalConfigurationId, comprising an integer value; (ii) one or more conditions for when to fulfill each HO configuration, e.g. triggerCondition comprising a set of measurement conditions; and (iii) a HO configuration, e.g. conditionalConfiguration comprising an RRCReconfiguration message.

The identifier such as the conditionalConfigurationId may be the same as the RRC-TransactionIdentifier of the RRCReconfiguration that is contained in the conditionalConfiguration IE.

The UE 10 may evaluate one or more conditions for conditional handovers (Step 312) and upon triggering the condition, may execute the conditional handover according to the conditional handover configuration (Step 314). The UE 10 may evaluate according to normal CHO procedures, i.e. check if trigger conditions are fulfilled, and apply the one that fulfills the condition. However, in some cases, multiple configurations can fulfill the trigger condition at the same time. The UE 10 may then select a conditional configuration among multiple candidates of conditional configurations fulfilling their one or more conditions. For example, in case there are multiple HO configurations which are fulfilled at the same time, the UE 10 may select one among those candidate HO configurations to apply. The UE 10 may select which of the HO configurations to apply based on an indication from the first radio network node 12. This indication may for example be a prioritization indication received from the network. This has the benefit that the first radio network node 12 may determine that a particular HO configuration is preferred. For example, the first radio network node 12 may have provided to the UE 10 one HO configuration which configures the UE 10 to use multiple carriers, while another configuration which only configures one carrier for the UE 10. If the first radio network node 12 wants to maximize the amount of bandwidth the UE 10 uses, the first radio network node 12 may give higher priority to the HO configuration with multiple carriers. Such a prioritization-indication may be provided to the first radio network node 12 and/or the UE 10 together with the HO configurations. There could be a prioritization among different target cells as well.

An enhancement of the example conditional handover structure discussed earlier is shown below, where the candidatePriority IE specifies the priority among the candidates, and configurationPriority specifies the priority among the HO configurations within a given candidate. A value of 1 could signify the highest priority, and higher values indicating lower priority (or it could be the other way around).

```
ConditionalConfigurationPerCell ::=        SEQUENCE {
    candidateCellId                        PhysCellId
      candidatePriority                    INTEGER (1..maxCandidateTargetCells) OPTIONAL
    conditionalConfigurationPerCellList        SEQUENCE (SIZE
                    (1..maxConditionalConfigurationsPerCell)) OF ConditionalConfiguration
}
ConditionalConfiguration ::=               SEQUENCE {
    conditionalConfigurationId             INTEGER (1..maxConfigurationPerCell) OPTIONAL,
                                                      -- Need R
    triggerCondition                       TriggerCondition,
    conditionalConfiguration               OCTET STRING (Containing RRCReconfiguration),
      configurationPriority                INTEGER (1..maxConfigurationPerCell) OPTIONAL
}
```

The candidate priority can be determined by the first radio network node 12, while the configuration priority can be determined by the source and/or target.

The UE 10 may select the HO configuration which has the lowest (or highest) identifier. This has the benefit of allowing the first radio network node 12 to decide which HO configuration the UE would select in case the conditions for the multiple candidates are fulfilled, while avoiding the overhead of an additional indication. In other embodiments, the UE 10 may select a HO configuration randomly among the candidates of HO configurations.

Alternatively or additionally, the UE may select the HO configuration based on the expected performance the UE 10 would achieve if applying the HO configuration. When evaluating performance, the UE 10 may consider different metrics such as throughput, power consumption, etc. For example, the UE 10 may select the HO configuration which the UE expects would provide highest throughput, which may for example be determined based on the number of carriers the configuration comprises, or the number of MIMO-layers the configuration comprises, etc. Or if coverage is a metric which should be optimized for the UE 10, the UE 10 may select the HO configuration which would be expected to give best power consumption performance, e.g. by having a carrier on lower frequency, etc.

During this calculation of expected performance, the UE 10 may consider other aspects as well such as the current UE battery or expected traffic. For example, if the UE 10 has an active video streaming session that requires very high throughput it may be optimal to select a HO configuration that includes carrier aggregation while if it is has only low throughput bearers, it my select a configuration that doesn't include carrier aggregation.

Alternatively or additionally, the UE may select the HO configuration based on how stringent the conditions for the HO configurations are. For example, if the UE 10 has two HO configurations and one HO configuration has an RSRP threshold of −100 dBm while the other HO configuration has −90 dBm, the UE 10 may select the latter one since that has a more stringent condition. Note that it is here assumed that both are fulfilled as otherwise not both would be considered candidates. This embodiment may also be extended to more than two separate thresholds for the same metric, associated to different configurations. The UE 10 may use other measurement metrics than reference signal received power (RSRP), e.g. reference signal received quality (RSRQ), signal to interference plus noise (SINR), etc.

In any event, the UE 10 according to the method in FIG. 3B may thereafter transmit the RRCReconfigurationComplete message toward the target cell candidate which fulfilled the trigger condition (Step 316).

The complete message, e.g. RRCReconfigurationComplete or a similar message, may contain the identifier associated to the handover configuration that fulfilled the trigger condition. Or, in case there were multiple configurations that fulfilled the condition, the complete message may contain the identifier associated to the handover configuration that was selected by the UE based on the criteria described above.

The UE 10 may respond to the triggered conditional handover towards the target candidate cell with a modified RRCReconfigurationComplete comprising the identifier. For example, the modified RRCReconfigurationComplete may be realized in some embodiments as:
RRCReconfigurationComplete Message

```
-- ASN1START
-- TAG-RRCRECONFIGURATIONCOMPLETE-START
RRCReconfigurationComplete ::=             SEQUENCE {
    rrc-TransactionIdentifier                  RRC-TransactionIdentifier,
```

```
    criticalExtensions                          CHOICE {
        rrcReconfigurationComplete                  RRCReconfigurationComplete-IEs,
        criticalExtensionsFuture                    SEQUENCE { }
    }
}
RRCReconfigurationComplete-IEs ::=              SEQUENCE {
    lateNonCriticalExtension                        OCTET STRING OPTIONAL,
    nonCriticalExtension                        RRCReconfigurationComplete-v1530-IEs   OPTIONAL
}
RRCReconfigurationComplete-v1530-IEs ::=        SEQUENCE {
    uplinkTxDirectCurrentList                       UplinkTxDirectCurrentList OPTIONAL,
    nonCriticalExtension                        SEQUENCE {} RRCReconfigurationComplete-v16xx-IEs
                                                    OPTIONAL
}
RRCReconfigurationComplete-v16xx-IEs ::=        SEQUENCE {
    conditionalConfigurationId                      INTEGER (1..maxConfigurationPerCell) OPTIONAL,
    nonCriticalExtension                            SEQUENCE{ } OPTIONAL
}
-- TAG-RRCRECONFIGURATIONCOMPLETE-STOP
-- ASN1STOP
```

If the UE 10 has not received an identifier for a certain conditional configuration, the UE 10 omits, or sets to a default value, e.g. 0, a configuration identity field in the complete message.

FIG. 3C shows a corresponding method performed by the first radio network node 12 according to some embodiments. As shown, the first radio network node 12 according to the method may request and receive handover configurations from other radio network node(s) (Step 320). The handover configuration(s) from the other radio network nodes may comprise identifier(s) for each conditional handover configuration. In some embodiments, the HO configurations from the other radio network nodes may comprise suggested conditions for each of the configuration(s), e.g. relative or absolute conditions, and the first radio network node 12 may take these HO conditions into account. The first radio network node 12 may adjust the suggested conditions based on e.g. conditions from other candidate cells, or from previous measurement reports.

The first radio network node 12 may associate the identifier to each received handover configuration. The identifiers may be determined implicitly, e.g. first configuration gets identity=1, second one gets identity=2, etc. Or, the first radio network node 12 may decide unique identities and indicate to the target network node such as the second radio network node 13 the assigned configuration identifier for the corresponding handover configuration.

Regardless, the first radio network node 12 as shown according to the method may transmit a message to the UE 10 comprising the handover configuration(s) and the associated identifiers (Step 322).

The first radio network node 12 may thereafter receive an indication that the UE 10 has executed the HO in a candidate target network node (e.g. via X2/Xn signaling or from the CN via S1/NG signaling) (Step 324). Upon receiving such an indication, the first radio network node 12 may perform one or more actions to trigger release (Step 326). For example, for each candidate target network node except the one in which the UE executed the CHO, the first radio network node 12 may transmit a single message to release the UE context/resources associated to all CHO configurations for that UE. Or, the first radio network node 12 may transmit one message per CHO configuration, comprising the conditional configuration identifier, to each candidate target network node to release the UE context/resources.

Note that, in order to setup handover configurations for the UE 10, the first radio network node 12 may request candidate target network nodes to provide conditional handover configurations. If any of these candidate radio network nodes intends to configure multiple alternative configurations associated to any particular cell, it will need to be able to distinguish which configuration the UE selects and activates.

The candidate target network node may provide a unique identifier associated to each HO configuration. This will allow the UE 10 to report to the candidate target network node in e.g. RRCReconfigurationComplete message, which of the conditional configuration it has used. The identifier may be configured per cell, i.e. the same conditional configuration identifier value can be reused for different cells. This will allow the UE to report to the candidate target network node in e.g. RRCReconfigurationComplete message, which of the conditional configuration it has used. Since the target radio network node is aware of which cell the UE 10 has performed the HO towards, only the identifiers associated to that target cell/node are relevant. The candidate target radio network node may include the identifier if there are more than one HO configuration associated to the specific cell, i.e. the conditional configuration identifier is omitted for a conditional configuration in case there is only a single conditional configuration for that particular cell for a given UE.

When the first radio network node 12 may receive the handover configuration(s) from the candidate target network node(s), it creates an RRC message comprising the different conditional configurations, with the associated trigger conditions, and conditional configuration identities provided by the candidate target radio network node (if needed). The source radio network node may then send the RRC message to the UE. In some embodiments, the identifier is determined implicitly for an HO configuration. This may be implemented by assigning identities based on the order the conditional configurations are provided. For example, if three conditional configurations are provided, the first configuration which is provided may be given index 1, the second one index 2, the third index 3.

Figure 1:
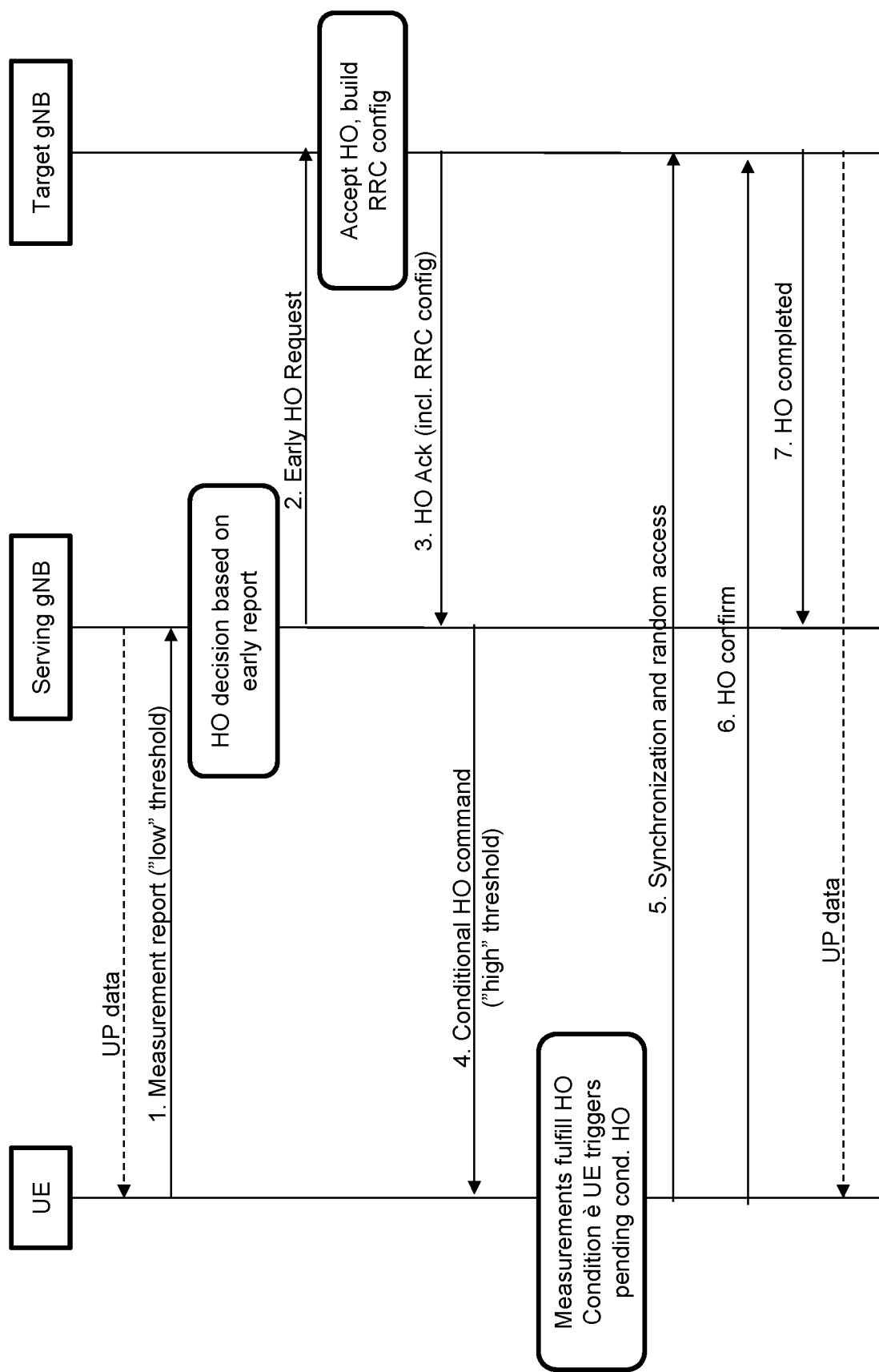
FIG. 1 is a call flow diagram of conditional handover according to some embodiments.

The source radio network node 12 in other embodiments allocates a unique configuration identity for each handover configuration associated with a target cell/node, and may indicate to the target the identities to be used. This can be indicated from the source to the network during the CHO request message (message 2 in FIG. 1) or after the reception of the CHO request ack from the target (message 3 in FIG. 1).

Figure 3D:
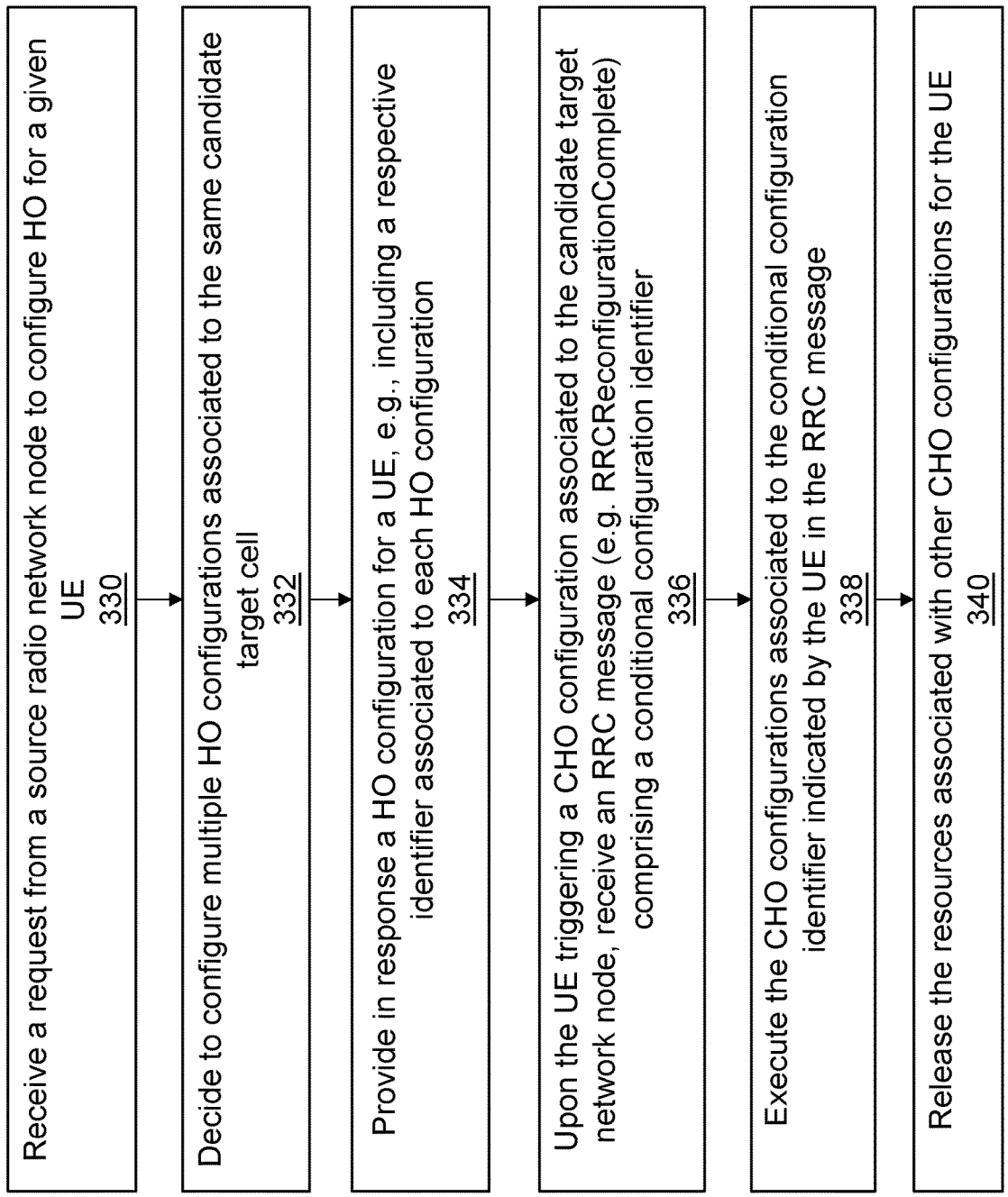
FIG. 3D is a logic flow diagram of a method performed by a second radio network node according to some embodiments.

FIG. 3D shows a corresponding method performed by the second radio network node 13 according to some embodiments. As shown, the second radio network node 13 according to the method may receive a request from a source radio network node 12 to configure HO for a given UE e.g. receiving a CHO or HO REQUEST message over X2, Xn or any other inter-node interface (Step 330). The request may optionally include information about the UE's expected traffic demands (e.g. buffer status report, etc.) and/or traffic type (e.g. voice, ftp, etc.).

The second radio network node 13 may decide to configure multiple HO configurations associated to the same candidate target cell (PCell, PSCell, SpCell, etc) (Step 332). The decision may be based on e.g. expected traffic, traffic type (voice, file transport protocol (FTP) streaming), UE capability. Different HO configurations may comprise e.g.: Different number of SCells (Zero or more); Different number of MIMO layers; With/without specific beam configurations; etc.

In any event, the second radio network node 13 may provide, in response, a HO configuration for a UE (Step 334). For example, the second radio network node 13 may transmit a CHO or HO REQUEST ACK message over X2, Xn or any other inter-node interface. The response may comprise recommended CHO conditions associated to different configurations and/or the response may comprise a respective identifier associated to each HO configuration.

The second radio network node 13 in some embodiments may reserve resources for CHO for that UE e.g. C-RNTI, contention-free RACH resources, etc.

As shown in FIG. 3D, the second radio network node 13 according to the method may, upon the UE triggering a CHO configuration associated to the candidate target network node, receive an RRC message (e.g. RRCReconfigurationComplete) comprising a conditional configuration identifier (Step 336).

In some embodiments, the second radio network node 13 may then execute the CHO configurations associated to the conditional configuration identifier indicated by the UE in the RRC message, e.g., the RRC Reconfiguration complete (Step 338).

The second radio network node 13 may furthermore release the resources associated with other CHO configurations for the UE (Step 340).

For example, for second radio network nodes neighboring the source radio network node which are configured with multiple CHO configurations associated to the same cell, the second radio network node may receive a message from the source radio network node to release all CHO configurations (e.g. after the UE has executed a CHO to another node) and then release all HO configurations associated to the UE. In other embodiments, the second radio network node 13 may receive one or more messages from the source radio network node 12 comprising an identifier, indicating to release a specific CHO configuration, and then may release the HO configurations associated to the UE as indicated by the conditional configuration identifier.

Generally, when a candidate target network node receives a conditional handover request from a neighboring network node which is connected to the UE 10, the candidate target radio network node 13 may decide to configure multiple conditional configurations associated to one or more of the configured cells. These alternative configurations may comprise e.g., different set of secondary cells (SCells), different MIMO configurations, different beam configurations, etc.

For each of these sets of HO configurations for a particular cell, the candidate target radio network node may create a CHO configuration and may assign the identifier. The identifier may be placed in the same message carrying the configurations. This may for example be an XnAP-message where a field is of the type of a list where each entry in the list is carrying a CHO configuration and a configuration identity. With this approach, the source radio network node may be aware of the identifier and must send the identifier alongside with the HO configuration.

In an alternative approach, the identifier may be placed within the CHO configuration itself, i.e. within the message which terminates in the UE. With this approach, the source node is not necessarily aware of the configuration identifier and since it is placed within a message which terminates in the UE, the source node does not need to take any action with respect to handling of the configuration identifier.

The candidate target network node 13 may also provide different trigger conditions for each of these subsets of configurations (e.g. a relative condition where a better signal strength/quality would correspond to a higher number of MIMO layers, etc.).

The candidate target network node then responds to the source network node with the conditional handover request acknowledgment comprising the set of CHO configurations.

When the UE 10 triggers a conditional handover to a candidate target network node and selects one out of several CHO configuration associated to one cell, the UE performs a random access towards that cell and transmits an RRCReconfigurationComplete message. The RRCReconfigurationComplete message comprises a conditional configuration identifier and the candidate target network node uses this identifier to determine which of the CHO configurations the UE has executed.

When the target node prepared the multiple CHO configurations it may have allocated resources for the UE. For example, the target may have prepared two CHOs for the UE; CHO1 which comprises a configuration without carrier aggregation (i.e. only a PCell) and CHO2 which comprises a configuration with carrier aggregation (i.e. both PCell and one or more SCells). And for CHO2 the target may have assigned sounding reference signal (SRS) resources for the UE on the SCells. In this case, the target node may upon reception of an RRCReconfigurationComplete message with configuration identifier for CHO1 determine that the UE no longer considers CHO2 valid, e.g. the UE may have discarded it or for other reason will not execute CHO2. In this case the target node may consider the resources associated with CHO2 to no longer be reserved for that UE. E.g. in the example with the SRS-resources above, the target may consider the SRS-resource on the SCells to be free.

Different threshold may be associated for different HO configurations. A target radio network node may have cells at three different frequencies, fa, fb, and fc, where fa is the highest frequency and hence the smallest coverage, and fc the lowest frequency and the biggest coverage. The target radio network node may send three HO configurations, say CHO1, CHO2 and CHO3, where CHO1 is the case without CA (i.e. only PCell at fc), CHO2 is the case with CA with fb and fc (i.e. PCell at fc, SCell at fb) and CHO3 is the case with CA with all cells (i.e. PCell at fc, SCells at fb and fc). The target radio network node may also associate the preferred signal levels of the PCell with the three different CHOs. For example, if the PCell quality is above w but below x RSRP, configure CHO1; if between x and y, use CHO2; if greater than y, use CHO3. These thresholds can be sent to the source in absolute values, or relative to each other. The source, upon getting these three CHO configurations, each with associated relative or absolute targets, can take them into account on top of the source's preferred trigger condition to trigger a HO to the target and configure the UE with a final trigger condition/thresholds for each CHO configuration.

Generally, then, embodiments herein relate to methods and apparatus such as a method performed by the UE 10 for handling communication of the UE, e.g. enabling mobility of the UE in the wireless communication network. According to the method the UE 10 may transmit an indication of HO configuration fulfilled. More particularly, the UE according to the method determines that a condition related to mobility of the UE is fulfilled, wherein the condition is part of a first handover configuration out of one or more handover configurations. The UE according to the method further transmits an indication that the condition is fulfilled and also indicates that the condition is part of the first handover configuration e.g. by using an identifier or indication of the first HO configuration.

Figure 4:
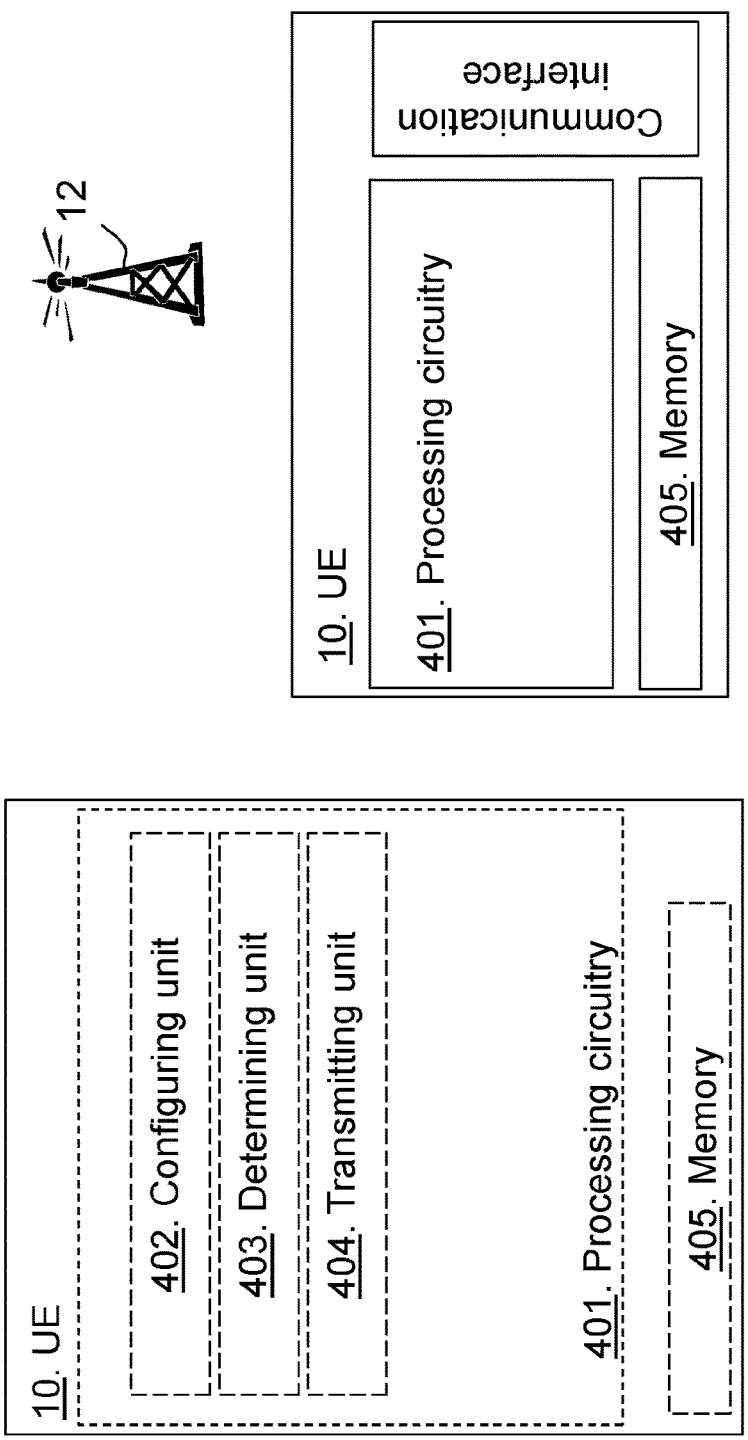
FIG. 4 is a block diagram of a user equipment according to some embodiments.

FIG. 4 is a block diagram depicting the UE 10 for handling communication of the UE, e.g. enabling mobility of the UE in the wireless communication network according to some embodiments herein.

The UE 10 may comprise processing circuitry 401, e.g. one or more processors, configured to perform the methods herein.

The UE 10 may comprise a configuring unit 402. The UE 10, the processing circuitry 401 and/or the configuring unit 402 is configured to setup or use one or more HO configurations e.g. received from the first radio network node 12.

The UE 10 may comprise a determining unit 403. The UE 10, the processing circuitry 401 and/or the determining unit 403 may be configured to determine that the condition related to mobility of the UE is fulfilled, wherein the condition is part of a first handover configuration out of one or more handover configurations.

The UE 10 may comprise a transmitting unit 404, e.g. a transmitter or transceiver. The UE 10, the processing circuitry 401 and/or the transmitting unit 404 is configured to transmit an indication that the condition is fulfilled and also indicates that the condition is part of the first handover configuration e.g. by using an identifier or indication of the first HO configuration.

The UE 10 further comprises a memory 405. The memory comprises one or more units to be used to store data on, such as indications, conditions, HO configurations, applications to perform the methods disclosed herein when being executed, and similar. Thus, the UE 10 may comprise the processing circuitry and the memory, said memory comprising instructions executable by said processing circuitry whereby said wireless device 10 is operative to perform the methods herein. The UE may comprise a communication interface comprising e.g. a transmitter, a receiver, a transceiver and/or one or more antennas.

The methods according to the embodiments described herein for the UE 10 are respectively implemented by means of e.g. a computer program 406 or a computer program product, comprising instructions, i.e., software code portions, which, when executed on at least one processor, cause the at least one processor to carry out the actions described herein, as performed by the UE 10. The computer program product 406 may be stored on a computer-readable storage medium 407, e.g. a disc, USB stick or similar. The computer-readable storage medium 407, having stored thereon the computer program product 406, may comprise the instructions which, when executed on at least one processor, cause the at least one processor to carry out the actions described herein, as performed by the UE 10. In some embodiments, the computer-readable storage medium may be a non-transitory computer-readable storage medium.

Embodiments herein further include a method performed by the first radio network node 12 for configuring the UE 10 and/or for handling communication of the UE 10, e.g. enabling mobility of the UE in the wireless communication network. The first radio network node 12 according to such method configures the UE 10 with one or more HO configurations and associated identifiers.

Figure 5:
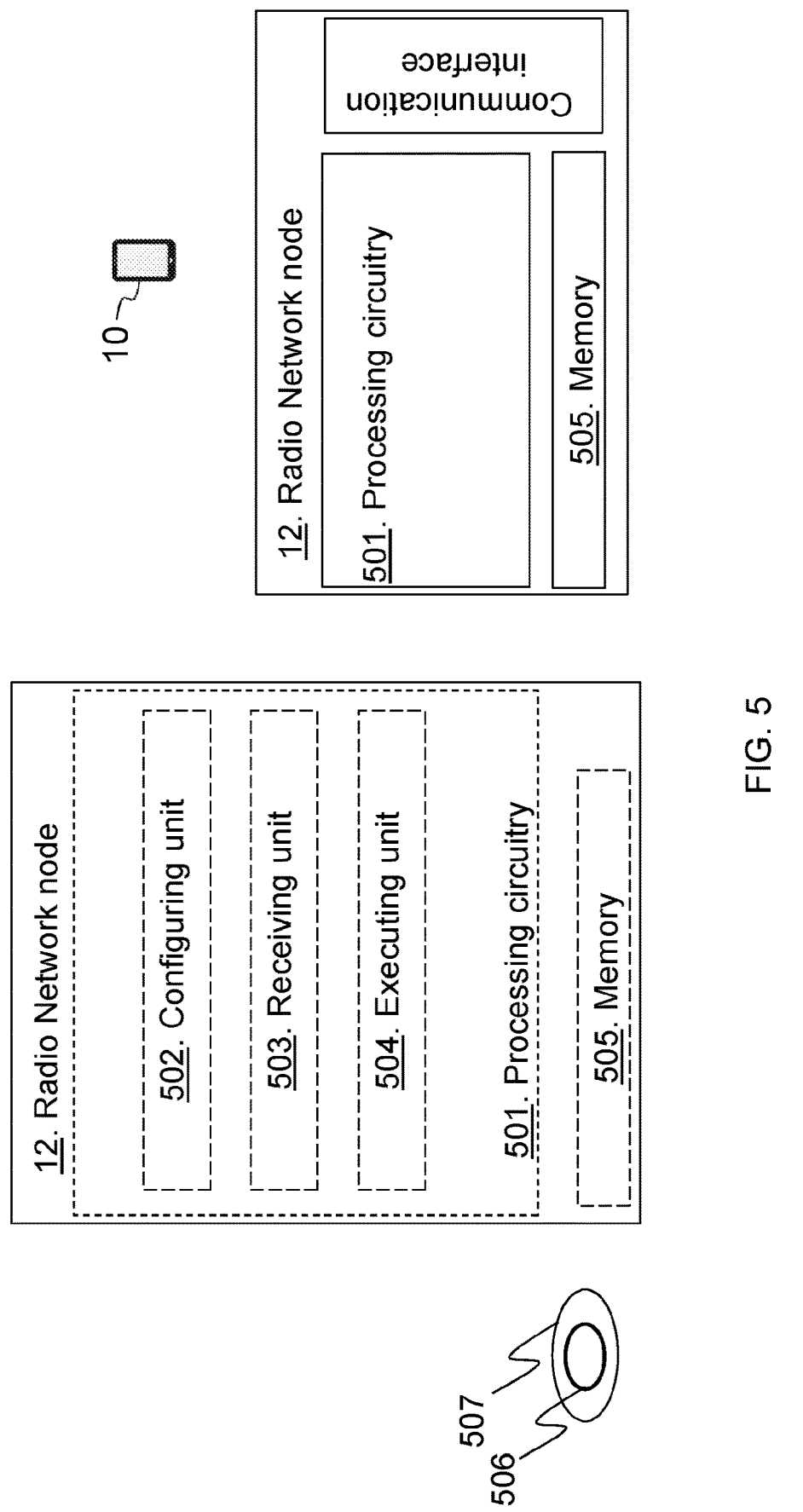
FIG. 5 is a block diagram of a first radio network node according to some embodiments.

FIG. 5 is a block diagram depicting the first radio network node 12 for handling communication of the UE, e.g. enabling mobility of the UE in the wireless communication network according to embodiments herein.

The first radio network node 12 such as a radio base station may comprise processing circuitry 501, e.g. one or more processors, configured to perform the methods herein.

The first radio network node 12 may comprise a configuring unit 502, e.g. a transmitter or transceiver. The radio network node 12, the processing circuitry 501 and/or the configuring unit 502 is configured to configure the UE with one or more HO configurations and associated identifiers.

The first radio network node 12 may comprise a receiving unit 503, e.g. a receiver or transceiver. The radio network node 12, the processing circuitry 501 and/or the receiving unit 503 may be configured to receive the indication that the condition is fulfilled and also an indication that the condition is part of the first handover configuration e.g. by using an identifier or indication of the first HO configuration.

The first radio network node 12 may comprise an executing unit 504. The radio network node 12, the processing circuitry 501 and/or the executing unit 504 may be configured to execute handover related actions such as sending a HO request to a second radio network node or similar.

The first radio network node 12 further comprises a memory 505. The memory comprises one or more units to be used to store data on, such as indications, HO configuration, identifiers, applications to perform the methods disclosed herein when being executed, and similar. Thus, the first radio network node 12 may comprise the processing circuitry and the memory, said memory comprising instructions executable by said processing circuitry whereby said radio network node is operative to perform the methods herein. The first radio network node 12 may comprise a communication interface comprising a transmitter, a receiver, a transceiver and/or one or more antennas.

The methods according to the embodiments described herein for the first radio network node 12 are respectively implemented by means of e.g. a computer program product 506 or a computer program, comprising instructions, i.e., software code portions, which, when executed on at least one processor, cause the at least one processor to carry out the actions described herein, as performed by the first radio network node 12. The computer program product 506 may be stored on a computer-readable storage medium 507, e.g. a disc, a universal serial bus (USB) stick, or similar. The computer-readable storage medium 507, having stored thereon the computer program product 506, may comprise the instructions which, when executed on at least one processor, cause the at least one processor to carry out the actions described herein, as performed by the first radio network node 12. In some embodiments, the computer-readable storage medium may be a non-transitory or a transitory computer-readable storage medium.

Furthermore, embodiments herein relate to e.g. a method at a candidate target network node, such as the second radio network node 13, for conditional handover (CHO) for a given UE and neighbor node of a source network node that is configuring a UE with handover configurations. In one such case, the HO configurations may be related to the same target cell of a given node (e.g. CHO1 that has a PCell=cell1, CHO2 that has a PCell=cell1, etc). Embodiments herein alternatively or additionally include a method at a candidate target network node for conditional handover for a given UE and neighbor node of a source network node that is configuring a UE with conditional handover configurations. In one such case, the conditional reconfigurations may be related to different target cells of a given node (e.g. CHO1 that has a PCell=cell1, CHO2 that has a PCell=cell2, etc . . . where cell1, cell2, . . . are different cells of the same target node or a different node.

Consider for example a method performed by a second radio network node 13 for handling communication of a UE, e.g. enabling mobility of the UE in the wireless communication network. The second radio network node 13 according to such method receives an indication that a condition is fulfilled and also an indication that the condition is part of a first handover configuration e.g. based on an identifier or indication of the first HO configuration.

Figure 6:
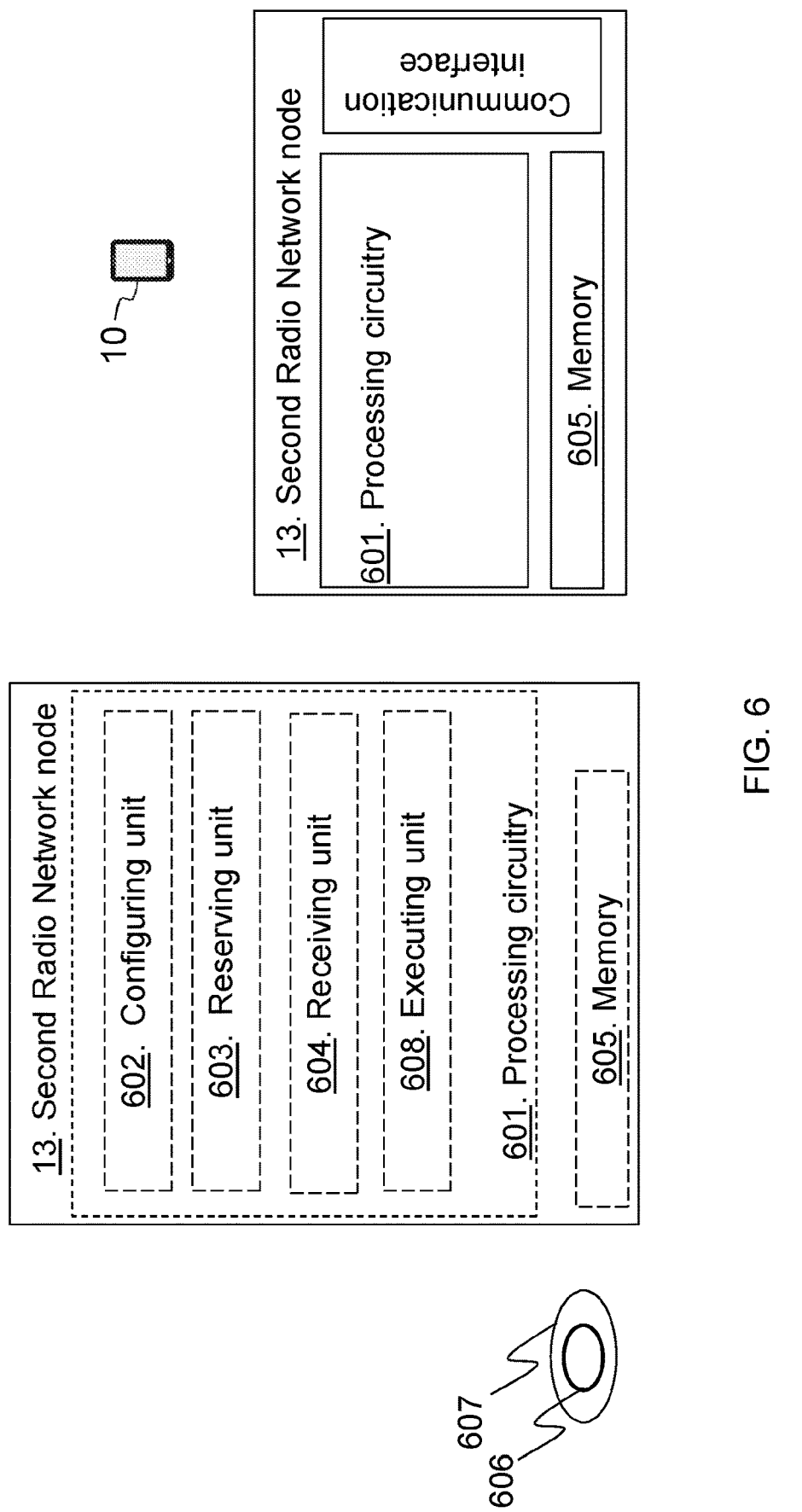
FIG. 6 is a block diagram of a second radio network node according to some embodiments.

FIG. 6 shows a block diagram disclosing a method performed by a second radio network node 13 for handling communication of the UE, e.g. enabling mobility of the UE in the wireless communication network according to embodiments herein.

The second radio network node 13 such as a radio base station may comprise processing circuitry 601, e.g. one or more processors, configured to perform the methods herein.

The second radio network node 13 may comprise a configuring unit 602, e.g. a transmitter or transceiver. The second radio network node 13, the processing circuitry 601 and/or the configuring unit 602 is configured to configure the UE and/or the first radio network node 12 with one or more HO configurations and associated identifiers.

The second radio network node 13 may comprise a reserving unit 603. The second radio network node 13, the processing circuitry 601 and/or the reserving unit 603 may be configured to reserve one or more radio resources based on HO configuration of the UE.

The second radio network node 13 may comprise a receiving unit 604, e.g. a receiver or transceiver. The second radio network node 13, the processing circuitry 601 and/or the receiving unit 604 may be configured to receive the indication that the condition is fulfilled and also the indication that the condition is part of the first handover configuration e.g. by using the identifier or indication of the first HO configuration.

The second radio network node 13 may comprise an executing unit 608. The second radio network node 13, the processing circuitry 601 and/or the executing unit 608 may be configured to execute handover related actions such as use the HO configuration of the UE 10.

The second radio network node 13 further comprises a memory 605. The memory comprises one or more units to be used to store data on, such as indications, HO configuration, identifiers, applications to perform the methods disclosed herein when being executed, and similar. Thus, the second radio network node 13 may comprise the processing circuitry and the memory, said memory comprising instructions executable by said processing circuitry whereby said radio network node is operative to perform the methods herein. The second radio network node 13 may comprise a communication interface comprising a transmitter, a receiver, a transceiver and/or one or more antennas.

The methods according to the embodiments described herein for the second radio network node 13 are respectively implemented by means of e.g. a computer program product 606 or a computer program, comprising instructions, i.e., software code portions, which, when executed on at least one processor, cause the at least one processor to carry out the actions described herein, as performed by the second radio network node 13. The computer program product 606 may be stored on a computer-readable storage medium 607, e.g. a disc, a universal serial bus (USB) stick, or similar. The computer-readable storage medium 607, having stored thereon the computer program product 606, may comprise the instructions which, when executed on at least one processor, cause the at least one processor to carry out the actions described herein, as performed by second radio network node 13. In some embodiments, the computer-readable storage medium may be a non-transitory or a transitory computer-readable storage medium.

Note that a conditional configuration may sometimes be associated with a handover procedure and the embodiments herein may be applicable both to the case when the conditional configuration is associated with a handover and when it is not. So if, in the description of some embodiment, the term conditional handover is used, it should not be understood as limiting but just an example, i.e. the embodiment could also be applicable to cases when the conditional configuration is not associated with a handover.

In some embodiments described herein, it is described how the UE 10 may receive multiple HO configurations for one or more target nodes and/or cells and how the UE 10 receives one or more identifiers which the UE uses in such scenarios. Also, there are methods described for source and target nodes. However, it should be noted that some the embodiments described herein can also be applied to intra-node/intra-cell scenarios as well, i.e. scenarios in which the UE 10 applies a conditional configuration for the same radio network node as the UE 10 is connected to. For example, in such scenarios, the first radio network node 12 sends HO configurations to the UE 10 which applies for the first radio network node 12 itself. In intra-node/intra-cell scenarios, the methods which are described to be applied by the "source node" or "target node" may take place within the single node.

Most of the embodiments are describing the handling in case of NR. However, it should be noted that this is only for the sake of brevity and the methods are applicable also to the case of LTE or other radio access technologies. As such, the enhancements referred to NR here in RRCReconfiguration, ConditionalRRCReconfiguration, RRCReconfiguration-Complete, etc. are applicable to the LTE equivalents of RRCConnectionReconfiguration, ConditionalRRCConnectionReconfiguration, RRCConnectionReconfigurationComplete, etc.

Accordingly, embodiments herein are described within the context of 3GPP NR radio technology (3GPP TS 38.300 V15.2.0 (2018 June)). It is understood that the embodiments herein are equally applicable to wireless access networks and UEs implementing other access technologies and standards. NR is used as an example technology in the embodiments herein, and using NR in the description therefore is particularly useful for understanding the problem and solutions solving the problem. In particular, the embodiments herein are applicable also to 3GPP LTE, or 3GPP LTE and NR integration, also denoted as non-standalone NR.

Figure 7A:
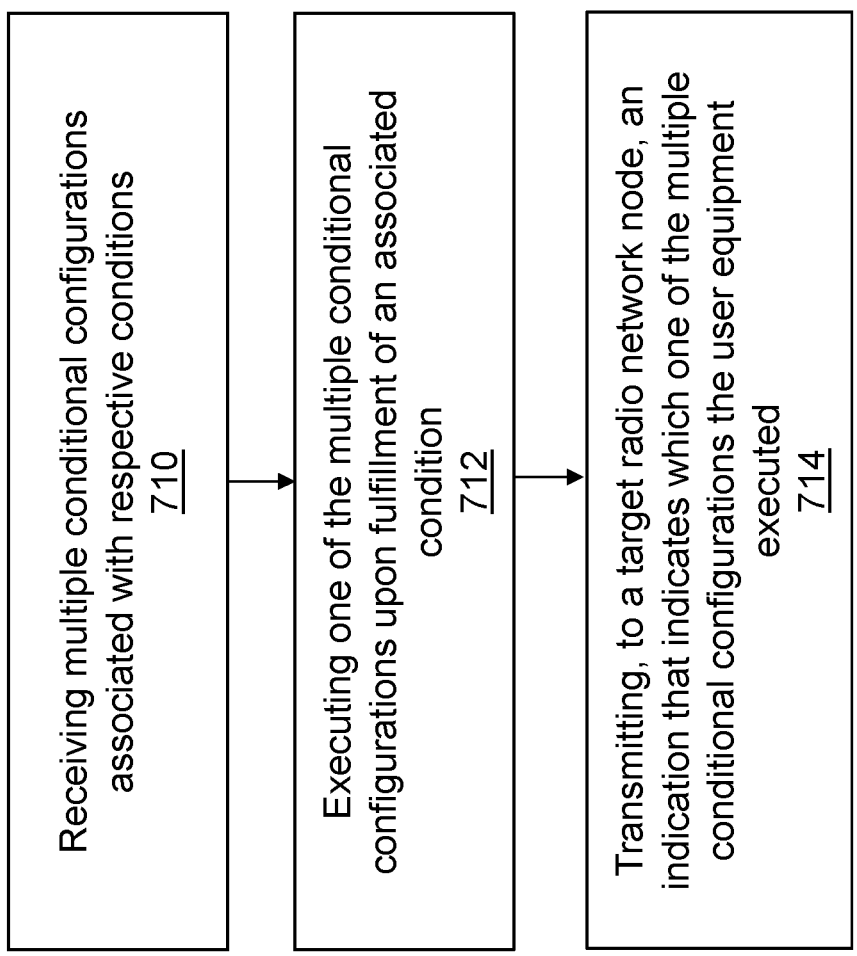
FIG. 7A is a logic flow diagram of a method performed by a user equipment according to some embodiments.

In view of the above modifications and variations, then, FIG. 7A shows a method performed by a user equipment 10 according to some embodiments. The method as depicted includes receiving multiple conditional configurations (e.g., multiple CHO configurations) associated with respective conditions (Step 710). Two or more of the multiple conditional configurations may for example be conditional configurations towards the same target node and/or towards the same target cell, e.g., with the same target primary cell (PCell). The user equipment 10 in any event is to execute a conditional configuration upon fulfillment of an associated condition. Note that a conditional configuration in this sense may also be referred to as a conditional reconfiguration, e.g., in the form of a conditional RRC Reconfiguration. Note further that this Step 710 may be exemplified by Step 301 in FIG. 3A. In any event, the method in FIG. 7A also includes executing one of the multiple conditional configurations upon fulfillment of an associated condition (Step 720), e.g., as exemplified by Step 303 in FIG. 3A. The method in FIG. 7A may further include transmitting, to a target radio network node, an indication that indicates which one of the multiple conditional configurations the user equipment 10 executed (Step 730), e.g., as exemplified by Step 304 in FIG. 3A. For example, the transmitted indication may comprise an identifier associated with the executed conditional configuration, e.g., an identifier received in a message or based on an order of the multiple conditional configurations in the message. Or, as another example, the transmitted indication may comprise an indication of a parameter configuration associated with the executed conditional configuration. In these and other embodiments, the indication may be included in a message that confirms successful completion of an RRC connection reconfiguration, e.g., an RRC Reconfiguration Complete message.

Figure 7B:
FIG. 7B is a logic flow diagram of a method performed by a first radio network node according to some embodiments.

FIG. 7B shows a method performed by a first radio network node 12 (e.g., a source radio network node) according to some embodiments. The method as depicted includes transmitting, to a user equipment 10, multiple conditional configurations (e.g., multiple CHO configurations) associated with respective conditions (Step 810). Two or more of the multiple conditional configurations may for example be conditional configurations towards the same target node and/or towards the same target cell, e.g., with the same target primary cell (PCell). The user equipment 10 in any event is to execute a conditional configuration upon fulfillment of an associated condition. Note that a conditional configuration in this sense may also be referred to as a conditional reconfiguration, e.g., in the form of a conditional RRC Reconfiguration. Note further that this Step 810 may be exemplified by Step 301 in FIG. 3A. In any event, the method in FIG. 7B also includes transmitting, to the user equipment 10, identifiers or parameter configurations respectively associated with the multiple conditional configurations (Step 820).

Figure 7C:
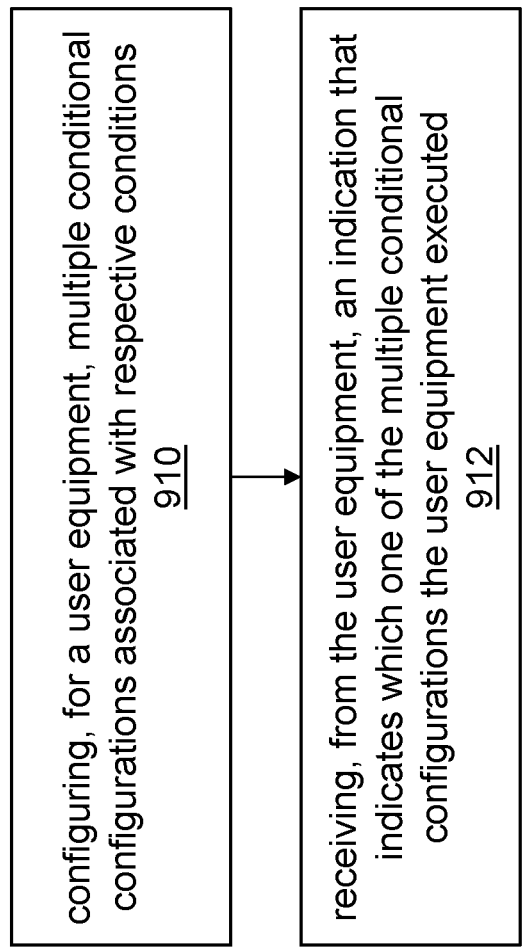
FIG. 7C is a logic flow diagram of a method performed by a second radio network node according to some embodiments.

FIG. 7C shows a method performed by a second radio network node 13 (e.g., a target radio network node) according to some embodiments. The method as depicted includes configuring, for a user equipment 10, multiple conditional configurations (e.g., multiple CHO configurations) associated with respective conditions (Step 910). Two or more of the multiple conditional configurations may for example be conditional configurations towards the same target node (e.g., the second radio network node 13 as a target candidate radio network node) and/or towards the same target cell, e.g., with the same target primary cell (PCell). The user equipment 10 in any event is to execute a conditional configuration upon fulfillment of an associated condition. Note that a conditional configuration in this sense may also be referred to as a conditional reconfiguration, e.g., in the form of a conditional RRC Reconfiguration. Note further that this Step 910 may be exemplified by Step 301 in FIG. 3A. In any event, the method in FIG. 7C also includes receiving, from the user equipment 10, an indication that indicates which one of the multiple conditional configurations the user equipment 10 executed (Step 920), e.g., as exemplified by Step 304 in FIG. 3A. For example, the received indication may comprise an identifier associated with the executed conditional configuration, e.g., an identifier in a message or based on an order of the multiple conditional configurations in the message. Or, as another example, the received indication may comprise an indication of a parameter configuration associated with the executed conditional configuration. In these and other embodiments, the indication may be included in a message that confirms successful completion of an RRC connection reconfiguration, e.g., an RRC Reconfiguration Complete message.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio network nodes will appreciate the cost, performance, and maintenance trade-offs inherent in these design choices.

Figures 10, 11:
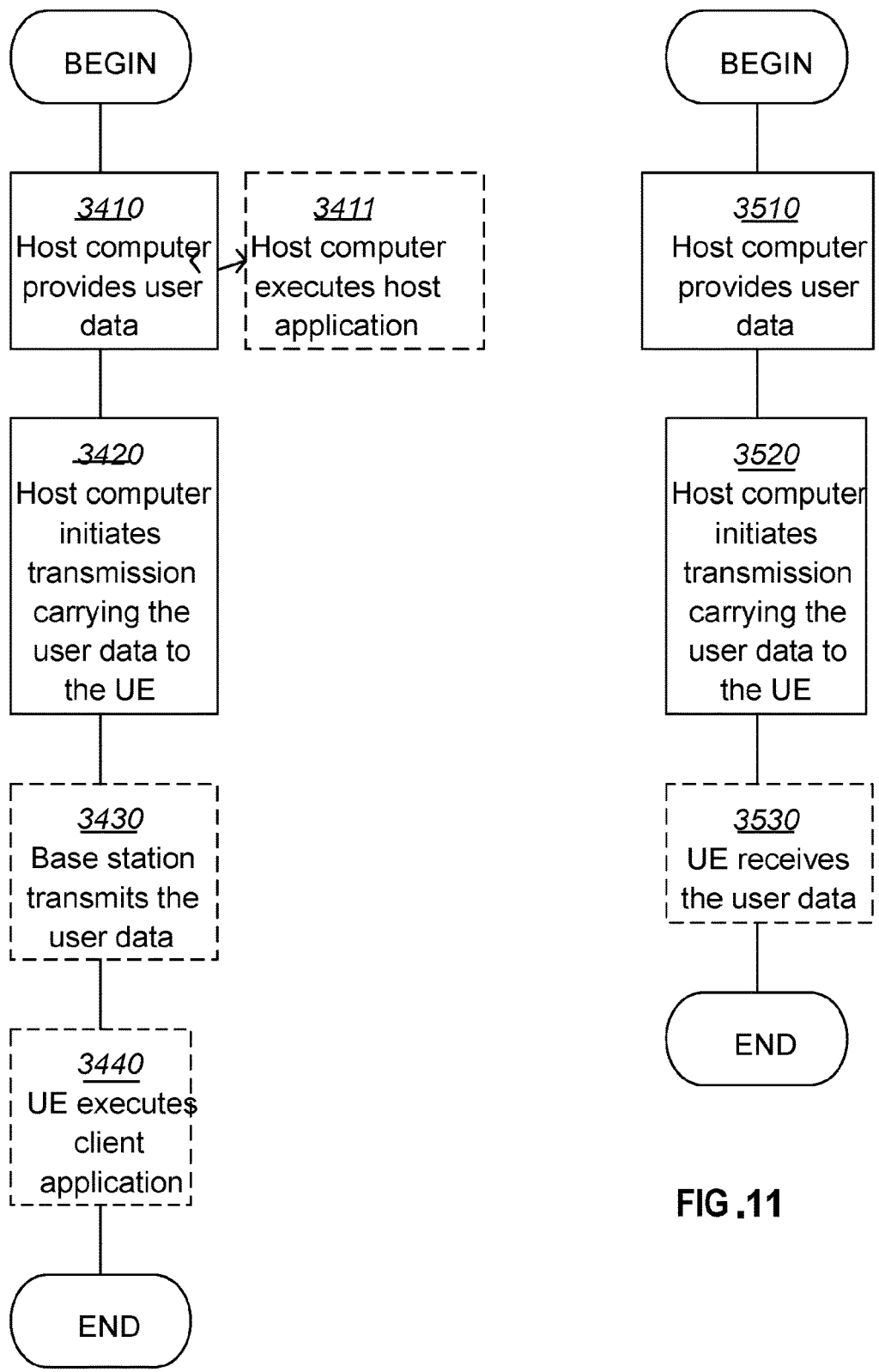
FIG. 10 is a flowchart illustrating a method implemented in a communication system, in accordance with one embodiment.
FIG. 11 is a flowchart illustrating a method implemented in a communication system, in accordance with one embodiment.

With reference to FIG. 10, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network nodes herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the wireless device 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8) served by the base station 3320. The communication interface 3326 may be configured to facilitate a connection 3360 to the host computer 3310. The connection 3360 may be direct or it may pass through a core network (not shown in FIG. 8) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 8:
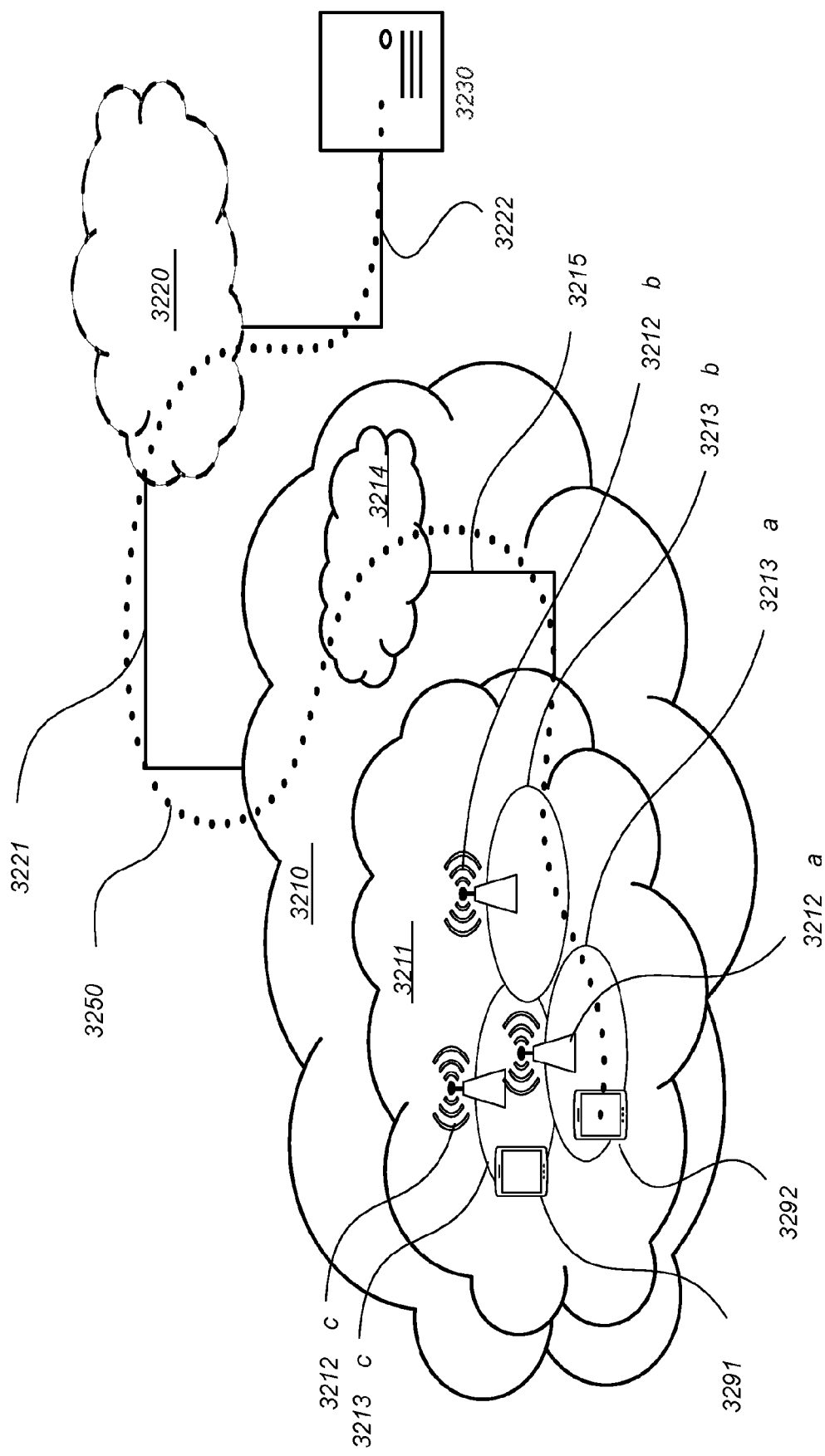
FIG. 8 is a block diagram of a wireless communication network according to some embodiments.
Figure 9:
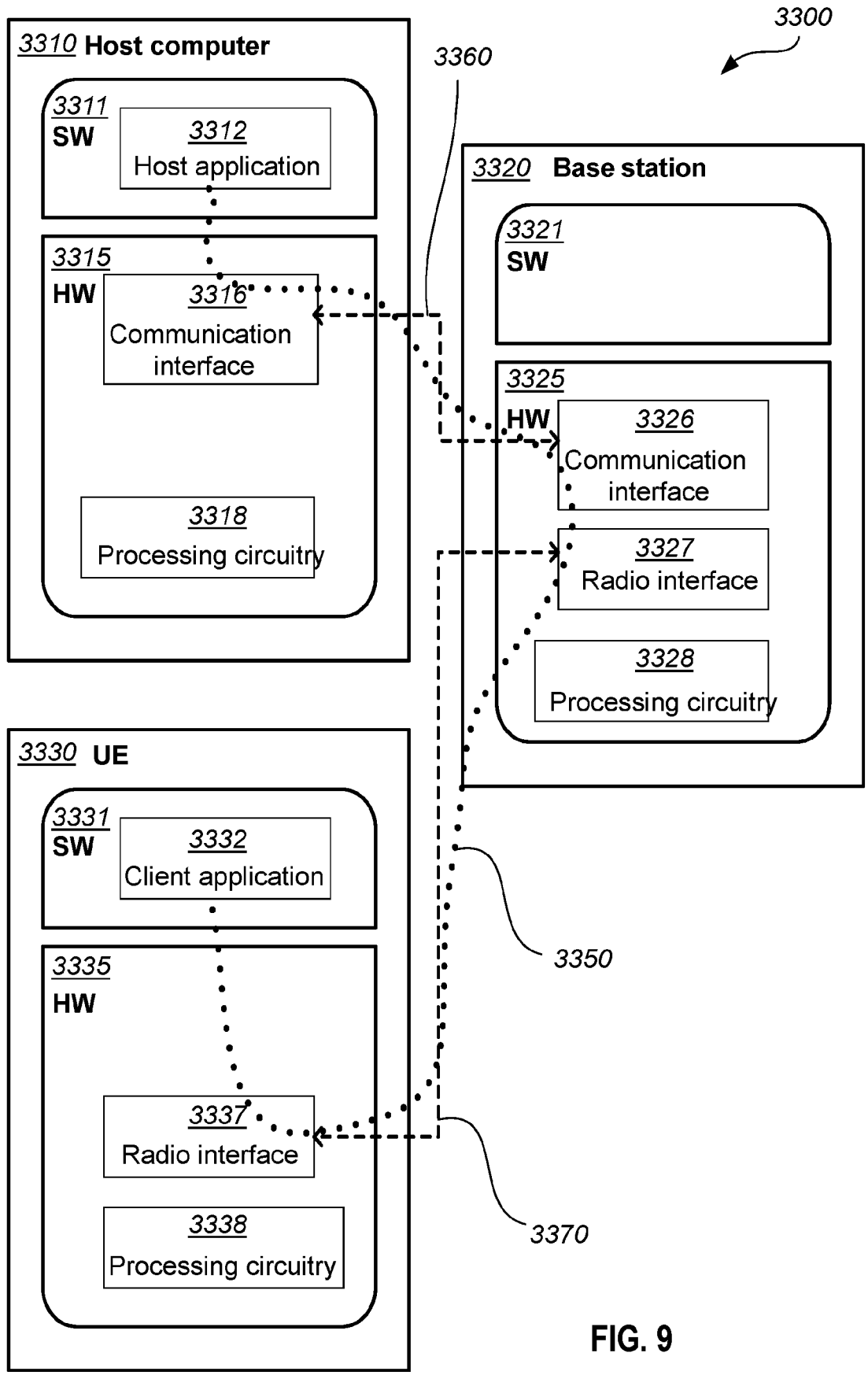
FIG. 9 is a block diagram of a host computer, a user equipment, and a base station according to some embodiments.

It is noted that the host computer 3310, base station 3320 and UE 3330 illustrated in FIG. 9 may be identical to the host computer 3230, one of the base stations 3212a, 3212b, 3212c and one of the UEs 3291, 3292 of FIG. 8, respectively. This is to say, the inner workings of these entities may be as shown in FIG. 9 and independently, the surrounding network topology may be that of FIG. 8.

In FIG. 9, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve mobility of the UE since correct HO configuration is indicated thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by a user equipment, the method comprising:
receiving multiple conditional configurations associated with respective conditions, wherein the user equipment is to execute a conditional configuration upon fulfillment of an associated condition;
executing one of the multiple conditional configurations upon fulfillment of an associated condition; and transmitting, to a target radio network node, an indication that indicates which one of the multiple conditional configurations the user equipment executed.

2. The method of claim 1, wherein different ones of the multiple conditional configurations are respectively associated with different identifiers, and wherein the transmitted indication comprises an identifier associated with the executed conditional configuration.

3. The method of claim 2, wherein receiving the multiple conditional configurations comprises receiving a message that indicates the multiple conditional configurations and that include the different identifiers associated with the multiple conditional configurations, and wherein the indication comprises an identifier that is received in the message and that is associated with the executed conditional configuration.

4. The method of claim 2, wherein the different identifiers comprise different conditional configuration identifiers.

5. The method of claim 2, wherein receiving the multiple conditional configurations comprises receiving a message that indicates the multiple conditional configurations, and wherein the transmitted indication is an identifier that is based on an order of the executed conditional configuration in the message.

6. The method of claim 1, wherein different ones of the multiple conditional configurations are respectively associated with different parameter configurations, and wherein the transmitted indication comprises an indication of a parameter configuration associated with the executed conditional configuration.

7. The method of claim 1, wherein different ones of the multiple conditional configurations are respectively associated with different sets of random access preambles, different time-frequency resource allocations, or different cell radio network temporary identifiers, C-RNTIs, and wherein the indication comprises transmission of a random access preamble in the set associated with the executed conditional configuration, transmission using the time-frequency resource allocation associated with the executed conditional configuration, or transmission of the C-RNTI associated with the executed conditional configuration.

8. A method performed by a radio network node, the method comprising:
    configuring, for a user equipment, multiple conditional configurations associated with respective conditions, wherein the user equipment is to execute a conditional configuration upon fulfillment of an associated condition, wherein the multiple conditional configurations are conditional configurations toward the radio network node as a target candidate radio network node; and
    receiving, from the user equipment, an indication that indicates which one of the multiple conditional configurations the user equipment executed.

9. The method of claim 8, wherein different ones of the multiple conditional configurations are respectively associated with different identifiers, and wherein the received indication comprises an identifier associated with the executed conditional configuration.

10. The method of claim 9, further comprising transmitting to another radio network node, or receiving from another radio network node, a message that includes the different identifiers associated with the multiple conditional configurations, and wherein the indication comprises an identifier that is included in the message and that is associated with the executed conditional configuration.

11. The method of claim 9, wherein the different identifiers comprise different conditional configuration identifiers.

12. The method of claim 9, further comprising transmitting a message that indicates the multiple conditional configurations, and wherein the received indication is an identifier that is based on an order of the executed conditional configuration in the message.

13. The method of claim 8, wherein different ones of the multiple conditional configurations are respectively associated with different parameter configurations, and wherein the received indication comprises an indication of a parameter configuration associated with the executed conditional configuration.

14. A method performed by a radio network node, the method comprising:
    transmitting, to a user equipment, multiple conditional configurations associated with respective conditions, wherein each condition is a condition whose fulfillment is to trigger the user equipment to execute an associated conditional configuration, wherein the radio network node is a source radio network node of the multiple conditional configurations; and
    transmitting, to the user equipment, identifiers or parameter configurations respectively associated with the multiple conditional configurations.

15. The method of claim 14, further comprising receiving the identifiers or parameter configurations respectively associated with the multiple conditional configurations from another radio network node that is a target of the multiple conditional configurations.

16. The method of claim 14, further comprising receiving the multiple conditional configurations from another radio network node that is a target of the multiple conditional configurations, generating the identifiers or parameter configurations, and transmitting the generated identifiers or parameter configurations to the another radio network node.

17. The method of claim 14, further comprising:
    receiving an indication that the user equipment has executed a conditional configuration in a candidate target network node; and
    responsive to receiving the indication, transmitting, to each of one or more other candidate target network nodes, a message that includes an identifier of a conditional configuration and indicates the other candidate target network node is to release a user equipment context and/or radio resources for the conditional configuration identified by the identifier.

18. The method of claim 14, wherein two or more of the multiple conditional configurations are conditional configurations towards the same target node.

19. The method of claim 14 wherein two or more of the multiple conditional configurations are conditional configurations towards the same target cell.

20. The method of claim 14, wherein two or more of the multiple conditional configurations are different conditional carrier aggregation configurations with the same target primary cell, PCell.

21. A user equipment comprising:
    a communication interface; and
    processing circuitry configured to:
    receive multiple conditional configurations associated with respective conditions, wherein the user equipment is to execute a conditional configuration upon fulfillment of an associated condition;
    execute one of the multiple conditional configurations upon fulfillment of an associated condition; and
    transmit, to a radio network node, an indication that indicates which one of the multiple conditional configurations the user equipment executed.

22. A radio network node comprising:

a communication interface; and processing circuitry configured to:

configure, for a user equipment, multiple conditional configurations associated with respective conditions, wherein each condition is a condition whose fulfillment is to trigger the user equipment to execute an associated conditional configuration, wherein the multiple conditional configurations are conditional configurations toward the radio network node as a target candidate radio network node; and receive, from the user equipment, an indication that indicates which one of the multiple conditional configurations the user equipment executed.

23. A radio network node comprising:

a communication interface; and processing circuitry configured to:

transmit, to a user equipment, multiple conditional configurations associated with respective conditions, wherein each condition is a condition whose fulfillment is to trigger the user equipment to execute an associated conditional configuration, wherein the radio network node is configured to be a source radio network node of the multiple conditional configurations; and transmit, to the user equipment, identifiers or parameter configurations respectively associated with the multiple conditional configurations.

* * * * *